US011671844B2

(12) United States Patent
Yerramalli et al.

(10) Patent No.: US 11,671,844 B2
(45) Date of Patent: *Jun. 6, 2023

(54) PREAMBLE TRANSMISSION CONFIGURATION

(71) Applicant: QUALCOMM Incorporated, San Diego, CA (US)

(72) Inventors: Srinivas Yerramalli, San Diego, CA (US); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/530,355

(22) Filed: Nov. 18, 2021

(65) Prior Publication Data

US 2022/0182846 A1 Jun. 9, 2022

Related U.S. Application Data

(63) Continuation of application No. 16/676,184, filed on Nov. 6, 2019, now Pat. No. 11,146,968.

(Continued)

(51) Int. Cl.
*H04W 4/00* (2018.01)
*H04W 16/14* (2009.01)
(Continued)

(52) U.S. Cl.
CPC ........... *H04W 16/14* (2013.01); *H04L 1/1671* (2013.01); *H04L 5/0023* (2013.01); *H04W 72/21* (2023.01); *H04W 74/0808* (2013.01)

(58) Field of Classification Search
None
See application file for complete search history.

(56) References Cited

U.S. PATENT DOCUMENTS

| 11,146,968 | B2* | 10/2021 | Yerramalli | .......... H04W 74/002 |
| 2012/0176967 | A1* | 7/2012 | Kim | ..................... H04W 52/365 |
| | | | | 370/328 |

(Continued)

FOREIGN PATENT DOCUMENTS

WO WO2016073662 A1 5/2016

OTHER PUBLICATIONS

International Preliminary Report on Patentability—PCT/US2019/060211, The International Bureau of WIPO—Geneva, Switzerland, dated May 20, 2021.

(Continued)

*Primary Examiner* — Clemence S Han
(74) *Attorney, Agent, or Firm* — Holland & Hart LLP

(57) ABSTRACT

Methods, systems, and devices for wireless communications are described. A communication device, such as a user equipment (UE) may transmit a message to a base station (e.g., a NodeB, an eNodeB (eNB), a next-generation NodeB or a giga-NodeB (either of which may be referred to as a gNB)) in wireless communications with the UE. The message may include a UE capability to append a preamble waveform to an uplink transmission to the base station. In some examples, a preamble waveform may include a Wi-Fi preamble or a new radio unlicensed (NR-U) preamble. Based on the UE capability, the base station may determine and transmit a preamble configuration to the UE, which the UE may use to generate and append a preamble waveform to another message for an uplink transmission to the base station.

30 Claims, 15 Drawing Sheets

Related U.S. Application Data

(60) Provisional application No. 62/759,959, filed on Nov. 12, 2018.

(51) Int. Cl.
  H04W 74/08 (2009.01)
  H04L 5/00 (2006.01)
  H04L 1/1607 (2023.01)
  H04W 72/21 (2023.01)

(56) References Cited

U.S. PATENT DOCUMENTS

| | | | | | |
|---|---|---|---|---|---|
| 2015/0085803 | A1* | 3/2015 | Hu | ................... | H04W 72/0413 370/329 |
| 2016/0113037 | A1* | 4/2016 | Mizusawa | ......... | H04W 74/0833 370/280 |
| 2016/0135189 | A1* | 5/2016 | Chandrasekhar | ....... | H04L 5/005 370/329 |
| 2016/0248555 | A1* | 8/2016 | Lei | ........................ | H04W 16/14 |
| 2018/0115998 | A1* | 4/2018 | Schreiber | ............ | H04L 27/2613 |
| 2018/0124790 | A1* | 5/2018 | Yerramalli | ............ | H04W 16/14 |
| 2018/0368142 | A1* | 12/2018 | Liou | ................. | H04W 74/0808 |
| 2019/0141695 | A1* | 5/2019 | Babaei | ................. | H04W 24/08 |
| 2019/0313457 | A1* | 10/2019 | Tsai | .................... | H04L 27/2666 |
| 2020/0154283 | A1 | 5/2020 | Yerramalli et al. | | |

OTHER PUBLICATIONS

International Search Report and Written Opinion—PCT/US2019/060211—ISA/EPO—dated Mar. 26, 2020.

* cited by examiner

PREAMBLE TRANSMISSION CONFIGURATION

CROSS REFERENCE

The present application for patent is a Continuation of U.S. patent application Ser. No. 16/676,184 by YERRAMALLI et al., entitled "PREAMBLE TRANSMISSION CONFIGURATION" filed Nov. 6, 2019, which claims the benefit of U.S. Provisional Patent Application No. 62/759,959 by YERRAMALLI et al., entitled "PREAMBLE TRANSMISSION CONFIGURATION," filed Nov. 12, 2018, assigned to the assignee hereof, and expressly incorporated by reference herein.

BACKGROUND

The following relates generally to wireless communications, and more specifically to preamble transmission configuration.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as user equipment (UE). In some wireless communications systems, base stations and UEs may communicate using different radio access technologies. Conventional interference avoidance techniques to support coexistence across different radio access technologies may be ineffective or deficient.

SUMMARY

The described techniques relate to improved methods, systems, devices, and apparatuses that support preamble transmission configuration. Some examples of wireless communications systems may support multiple different radio access technologies including licensed and unlicensed radio frequency spectrum bands. For example, a user equipment (UE) may support fourth generation (4G) systems such as Long Term Evolution (LTE) systems, LTE-Advanced (LTE-A) systems, and fifth generation (5G) systems which may be referred to as New Radio (NR) systems. The UE may additionally, or alternatively, support wireless local area networks (WLAN), such as Wi-Fi (i.e., Institute of Electrical and Electronics Engineers (IEEE) 802.11). Accordingly, a UE may be capable of supporting at least one or a combination of the different radio access technologies.

In some examples of a wireless communications system, a UE supporting one radio access technology may have a negative impact (e.g., interference) on other UEs supporting another radio access technology. For example, a UE supporting 4G, 5G radio access technologies may pose contention-based challenges to other UEs supporting Wi-Fi radio access technologies. To support coexistence between multiple different radio access technologies, a UE may support a preamble transmission, such as a Wi-Fi preamble or a new radio unlicensed (NR-U) preamble, and more specifically the UE may support a preamble transmission in accordance with a preamble configuration. For example, a UE may operate according to 4G, 5G radio access technologies. In this example, the UE may be capable of transmitting a Wi-Fi preamble without actually supporting Wi-Fi radio access technologies. Therefore, the UE supporting 4G, 5G radio access technologies may append a Wi-Fi preamble to NR-U communications. As a result, the UE may support coexistence between 4G, 5G radio access technologies enabled UEs and Wi-Fi radio access technologies enabled UEs. In addition, by appending a Wi-Fi preamble to NR-U communications, the UE may provide a fair channel contention for other UEs (e.g., Wi-Fi devices) attempting to coexist with UEs (e.g., 4G, 5G devices) on a same channel.

A method of wireless communications at a UE is described. The method may include transmitting a first message to a base station, the first message indicating a UE capability to append a preamble waveform to an uplink transmission to the base station, where the preamble waveform is directed at a device, appending the preamble waveform to a second message for transmission to the base station based at least in part on the indicated UE capability, and transmitting the second message with the appended preamble waveform.

An apparatus for wireless communications is described. The apparatus may include a processor, memory in electronic communication with the processor, and instructions stored in the memory. The instructions may be executable by the processor to cause the apparatus to transmit a first message to a base station, the first message indicating an apparatus capability to append a preamble waveform to an uplink transmission to the base station, where the preamble waveform is directed at a device, append the preamble waveform to a second message for transmission to the base station based on the indicated apparatus capability, and transmit the second message with the appended preamble waveform.

Another apparatus for wireless communications is described. The apparatus may include means for transmitting a first message to a base station, the first message indicating an apparatus capability to append a preamble waveform to an uplink transmission to the base station, where the preamble waveform is directed at a device, appending the preamble waveform to a second message for transmission to the base station based on the indicated apparatus capability, and transmitting the second message with the appended preamble waveform.

A non-transitory computer-readable medium storing code for wireless communications at a UE is described. The code may include instructions executable by a processor to transmit a first message to a base station, the first message indicating a UE capability to append a preamble waveform to an uplink transmission to the base station, where the preamble waveform is directed at a device, append the preamble waveform to a second message for transmission to the base station based on the indicated UE capability, and transmit the second message with the appended preamble waveform.

Some examples of the method, apparatuses, and non-transitory computer-readable medium described herein may further include operations, features, means, or instructions for including in the first message an indication of a version of the preamble waveform, where the preamble waveform appended to the second message may be of the indicated version.

Some examples of the method, apparatuses, and non-transitory computer-readable medium described herein may further include operations, features, means, or instructions for including in the first message an indication that the UE dynamically selects a version of the preamble waveform, where appending the preamble waveform to the second message includes dynamically selecting the version of the preamble waveform.

Some examples of the method, apparatuses, and non-transitory computer-readable medium described herein may further include operations, features, means, or instructions for including in the first message an indication of a length of the preamble waveform.

In some examples of the method, apparatuses, and non-transitory computer-readable medium described herein, the preamble waveform comprises a Wi-Fi preamble or a new radio unlicensed (NR-U) preamble.

Some examples of the method, apparatuses, and non-transitory computer-readable medium described herein may further include operations, features, means, or instructions for including in the Wi-Fi preamble an indication of a device type of the UE.

A method of wireless communications at a base station is described. The method may include receiving a first message from a UE, the first message indicating a UE capability to append a preamble waveform to an uplink transmission to the base station, where the preamble waveform is directed at a device; and receiving a second message with the appended preamble waveform.

An apparatus for wireless communications is described. The apparatus may include a processor, memory in electronic communication with the processor, and instructions stored in the memory. The instructions may be executable by the processor to cause the apparatus to receive a first message from a UE, the first message indicating a UE capability to append a preamble waveform to an uplink transmission to the apparatus, where the preamble waveform is directed at a device other than the apparatus; and receive a second message with the appended preamble waveform.

Another apparatus for wireless communications is described. The apparatus may include means for receiving a first message from a UE, the first message indicating a UE capability to append a preamble waveform to an uplink transmission to the apparatus, where the preamble waveform is directed at a device other than the apparatus; and receiving a second message with the appended preamble waveform.

A non-transitory computer-readable medium storing code for wireless communications at a base station is described. The code may include instructions executable by a processor to receive a first message from a UE, the first message indicating a UE capability to append a preamble waveform to an uplink transmission to the base station, where the preamble waveform is directed at a device; and receive a second message with the appended preamble waveform.

In some examples of the method, apparatuses, and non-transitory computer-readable medium described herein, the first message comprises an indication of a version of the preamble waveform, where the preamble waveform appended to the second message is of the indicated version.

In some examples of the method, apparatuses, and non-transitory computer-readable medium described herein, the first message comprises an indication that the UE dynamically selects a version of the preamble waveform.

In some examples of the method, apparatuses, and non-transitory computer-readable medium described herein, the first message comprises an indication of a length of the preamble waveform.

In some examples of the method, apparatuses, and non-transitory computer-readable medium described herein, the preamble waveform comprises a Wi-Fi preamble or a new radio unlicensed (NR-U) preamble.

In some examples of the method, apparatuses, and non-transitory computer-readable medium described herein, the Wi-Fi preamble comprises an indication of a device type of the UE.

A method of wireless communications at a UE is described. The method may include receiving from a base station, a preamble configuration for uplink transmissions, generating, based on the preamble configuration, a preamble waveform directed to a device, and performing an uplink transmission to the base station, where the preamble waveform is appended to a beginning of the uplink transmission based on the preamble configuration.

An apparatus for wireless communications is described. The apparatus may include a processor, memory in electronic communication with the processor, and instructions stored in the memory. The instructions may be executable by the processor to cause the apparatus to receive from a base station, a preamble configuration for uplink transmissions, generate, based on the preamble configuration, a preamble waveform directed to a device, and perform an uplink transmission to the base station, where the preamble waveform is appended to a beginning of the uplink transmission based on the preamble configuration.

Another apparatus for wireless communications is described. The apparatus may include means for receiving from a base station, a preamble configuration for uplink transmissions, generating, based on the preamble configuration, a preamble waveform directed to a device, and performing an uplink transmission to the base station, where the preamble waveform is appended to a beginning of the uplink transmission based on the preamble configuration.

A non-transitory computer-readable medium storing code for wireless communications at a UE is described. The code may include instructions executable by a processor to receive from a base station, a preamble configuration for uplink transmissions, generate, based on the preamble configuration, a preamble waveform directed to a device, and perform an uplink transmission to the base station, where the preamble waveform is appended to a beginning of the uplink transmission based on the preamble configuration.

Some examples of the method, apparatuses, and non-transitory computer-readable medium described herein may further include operations, features, means, or instructions for determining, based on the preamble configuration, whether the UE may be permitted to append the preamble waveform to the uplink transmission, where performing the uplink transmission to the base station may be based on the determination.

Some examples of the method, apparatuses, and non-transitory computer-readable medium described herein may further include operations, features, means, or instructions for determining, based on the preamble configuration, a format of the preamble waveform, where generating the preamble waveform may be based on the determined format.

In some examples of the method, apparatuses, and non-transitory computer-readable medium described herein, determining the format of the preamble waveform is further based at least in part on a band of the uplink transmission.

Some examples of the method, apparatuses, and non-transitory computer-readable medium described herein may further include operations, features, means, or instructions for determining, based on the preamble configuration, a time at which the UE may be permitted to transmit the preamble waveform, where generating the preamble waveform may be based on the determined time.

In some examples of the method, apparatuses, and non-transitory computer-readable medium described herein, the preamble configuration is received in a downlink control information block including an indication of the time at which the UE is permitted to transmit the preamble waveform.

In some examples of the method, apparatuses, and non-transitory computer-readable medium described herein, determining the time at which the UE is permitted to transmit the preamble waveform is further based at least in part on one or more of: an uplink channel configuration of the UE or a bandwidth of the uplink transmission.

Some examples of the method, apparatuses, and non-transitory computer-readable medium described herein may further include operations, features, means, or instructions for receiving an indication of a transmission opportunity of the base station; where determining the time at which the UE may be permitted to transmit the preamble waveform may be further based at least in part on the transmission opportunity of the base station.

Some examples of the method, apparatuses, and non-transitory computer-readable medium described herein may further include operations, features, means, or instructions for receiving an indication of a duration field value from the base station; where generating the preamble waveform includes signaling the indicated duration field value in the preamble waveform.

Some examples of the method, apparatuses, and non-transitory computer-readable medium described herein may further include operations, features, means, or instructions for receiving an indication that a transmit power setting and a beamforming matrix configured for the uplink transmission may be applicable to the preamble waveform; where the uplink transmission includes transmitting the preamble waveform according to the transmit power setting and using the beamforming matrix.

Some examples of the method, apparatuses, and non-transitory computer-readable medium described herein may further include operations, features, means, or instructions for determining, based on the preamble configuration, an energy detection threshold to use for access to a channel, and performing a channel access procedure based on the determined energy detection threshold.

A method of wireless communications at a base station is described. The method may include transmitting to a UE, a preamble configuration including an indication to append a preamble waveform to an uplink transmission, where the preamble waveform is directed at a device and receiving the uplink transmission from the UE, where the preamble waveform is appended to a beginning of the uplink transmission based on the preamble configuration.

An apparatus for wireless communications is described. The apparatus may include a processor, memory in electronic communication with the processor, and instructions stored in the memory. The instructions may be executable by the processor to cause the apparatus to transmit to a UE, a preamble configuration including an indication to append a preamble waveform to an uplink transmission, where the preamble waveform is directed at a device other than the apparatus and receive the uplink transmission from the UE, where the preamble waveform is appended to a beginning of the uplink transmission based on the preamble configuration.

Another apparatus for wireless communications is described. The apparatus may include means for transmitting to a UE, a preamble configuration including an indication to append a preamble waveform to an uplink transmission, where the preamble waveform is directed at a device other than the apparatus and receiving the uplink transmission from the UE, where the preamble waveform is appended to a beginning of the uplink transmission based on the preamble configuration.

A non-transitory computer-readable medium storing code for wireless communications at a base station is described. The code may include instructions executable by a processor to transmit to a UE, a preamble configuration including an indication to append a preamble waveform to an uplink transmission, where the preamble waveform is directed at a device and receive the uplink transmission from the UE, where the preamble waveform is appended to a beginning of the uplink transmission based on the preamble configuration.

Some examples of the method, apparatuses, and non-transitory computer-readable medium described herein may further include operations, features, means, or instructions for including in the preamble configuration an indication that the UE may be permitted to append the preamble waveform to the uplink transmission.

Some examples of the method, apparatuses, and non-transitory computer-readable medium described herein may further include operations, features, means, or instructions for including in the preamble configuration an indication of a format of the preamble waveform.

In some examples of the method, apparatuses, and non-transitory computer-readable medium described herein, the format of the preamble waveform is further based at least in part on a band of the uplink transmission.

Some examples of the method, apparatuses, and non-transitory computer-readable medium described herein may further include operations, features, means, or instructions for including in the preamble configuration an indication of a time at which the UE may be permitted to transmit the preamble waveform.

In some examples of the method, apparatuses, and non-transitory computer-readable medium described herein, the preamble configuration is transmitted in a downlink control information block including an indication of the time at which the UE is permitted to transmit the preamble waveform.

In some examples of the method, apparatuses, and non-transitory computer-readable medium described herein, the time at which the UE is permitted to transmit the preamble waveform is further based at least in part on one or more of: an uplink channel configuration of the UE or a bandwidth of the uplink transmission.

Some examples of the method, apparatuses, and non-transitory computer-readable medium described herein may further include operations, features, means, or instructions for transmitting an indication of a transmission opportunity of the base station to the UE; where the time at which the UE may be permitted to transmit the preamble waveform may be further based at least in part on the transmission opportunity of the base station.

Some examples of the method, apparatuses, and non-transitory computer-readable medium described herein may further include operations, features, means, or instructions for transmitting an indication of a duration field value to the UE.

Some examples of the method, apparatuses, and non-transitory computer-readable medium described herein may further include operations, features, means, or instructions for transmitting an indication that a transmit power setting and a beamforming matrix configured for the uplink transmission may be applicable to the preamble waveform, where the uplink transmission includes receiving the preamble waveform according to the transmit power setting and using the beamforming matrix.

Some examples of the method, apparatuses, and non-transitory computer-readable medium described herein may further include operations, features, means, or instructions for determining, based on the preamble configuration, an energy detection threshold to use for access to a channel, and performing a channel access procedure based on the determined energy detection threshold.

DETAILED DESCRIPTION

Figure 1:
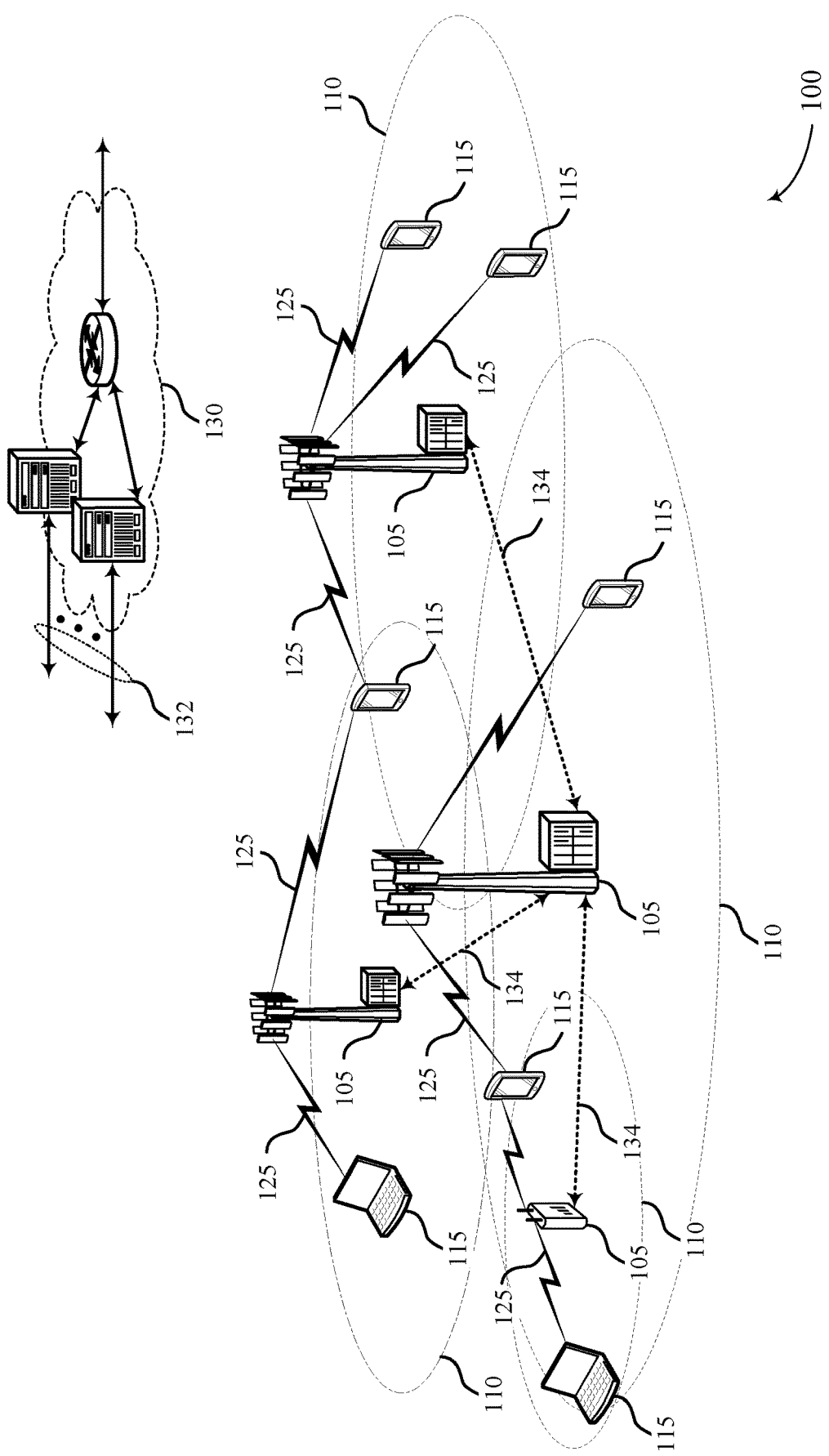
FIGS. 1 and 2 illustrates examples of wireless communications systems that supports preamble transmission configuration in accordance with aspects of the present disclosure.

Some examples of wireless communications systems may support multiple different radio access technologies including licensed and unlicensed radio frequency spectrum bands. For example, a communication device may support fourth generation (4G) systems such as Long Term Evolution (LTE) systems, LTE-Advanced (LTE-A) systems, or LTE-A Pro systems, and fifth generation (5G) New Radio (NR) systems. The communication device may additionally, or alternatively, support wireless local area networks (WLAN), such as Wi-Fi (i.e., Institute of Electrical and Electronics Engineers (IEEE) 802.11). Accordingly, the communication device may be capable of supporting at least one or a combination of the different radio access technologies.

A user equipment (UE) may have capability to operate in both licensed and unlicensed radio frequency spectrum bands. For example, a UE may operate according to 4G, 5G radio access technologies, as well as according to Wi-Fi radio access technologies. Although these different radio access technologies may benefit the UE, for example, in terms of efficiency and latency, there may be a negative impact (e.g., interference) on a wireless communications system. For example, a UE supporting 4G, 5G radio access technologies may pose contention-based challenges to other UEs supporting Wi-Fi radio access technologies. To support coexistence between 4G, 5G radio access technologies, as well as Wi-Fi radio access technologies, a UE may support a preamble transmission, such as a Wi-Fi preamble or a new radio unlicensed (NR-U) preamble.

By way of example, a UE may operate according to 4G, 5G radio access technologies without supporting Wi-Fi radio access technologies. In this example, the UE may be capable of transmitting a Wi-Fi preamble without actually supporting Wi-Fi radio access technologies. That is, the UE supporting 4G, 5G radio access technologies may append a Wi-Fi preamble to NR-U communications. As a result, the UE may support coexistence between multiple different radio access technologies. For example, the UE may facilitate an effective channel contention for other UEs (e.g., Wi-Fi devices) attempting to coexist with UEs (e.g., 4G, 5G devices) on a same channel.

To further support coexistence between 4G, 5G radio access technologies, as well as Wi-Fi radio access technologies, a UE may support a preamble transmission in accordance with a preamble configuration. For example, a UE may transmit a message to a base station in wireless communications with the UE. The message may indicate a UE capability to append a preamble waveform to an uplink transmission to the base station. The base station may generate a preamble configuration based on the UE capability. The preamble configuration may include, but is not limited to, a format of the preamble waveform, a time at which the UE is permitted to transmit the preamble waveform, a transmit power setting and a beamforming matrix configured applicable to the preamble waveform, among others. Upon receiving the preamble configuration from the base station, the UE may generate, based on the preamble configuration, a preamble waveform and append the preamble waveform to an uplink transmission to the base station.

Aspects of the disclosure are initially described in the context of a wireless communications system. Aspects of the disclosure are then illustrated by and described with reference to a process flow. Aspects of the disclosure are further illustrated by and described with reference to apparatus diagrams, system diagrams, and flowcharts that relate to preamble transmission configuration.

FIG. 1 illustrates an example of a wireless communications system 100 that supports preamble transmission configuration in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130). The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, for example, in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz. The wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, the wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARM) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs). In some examples of the wireless communications system 100, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth. The wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable. The wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Figure 2:
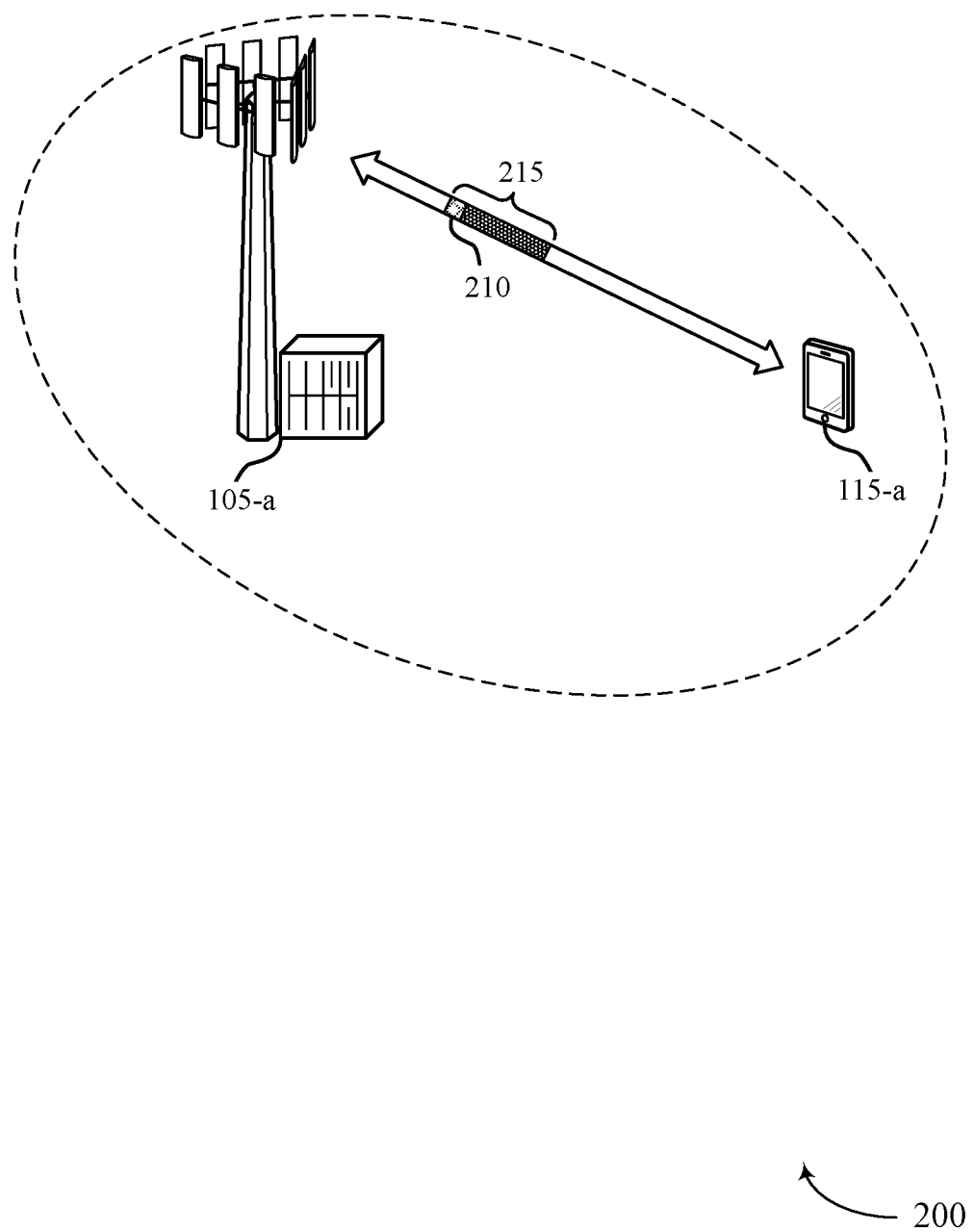

FIG. 2 illustrates an example of a wireless communications system 200 that supports preamble transmission configuration in accordance with aspects of the present disclosure. The wireless communications system 200 may include a base station 105-a and a UE 115-a, which may be examples of the corresponding devices described with reference to FIG. 1. The wireless communications system 200 may also implement aspects of the wireless communications system 100, such as the base station 105-a and the UE 115-a supporting multiple different radio access technologies including licensed and unlicensed radio frequency spectrum bands. For example, the base station 105-a and the UE 115-a may support 4G systems such as LTE systems, LTE-A systems, and 5G systems. The base station 105-a and the UE 115-a may additionally, or alternatively, support WLAN, such as Wi-Fi (i.e., IEEE 802.11). Accordingly, the base station 105-a and the UE 115-a may be capable of supporting at least one or a combination of the different radio access technologies.

Although supporting multiple different radio access technologies may benefit the base station 105-a and the UE 115-a, for example, in terms of efficiency and latency, there may be an effect on the wireless communications system 200 performance. For example, when either or both the base station 105-a and the UE 115-a operate according to a first radio access technology and have the capability to alternatively operate according to a second radio access technology, there may be possible interference in the wireless communications system 200. Alternatively, the UE 115-a may operate according to a first radio access technology and impact (e.g., interference) performance on other UEs (not shown) operating according to a second radio access technology. To mitigate interference-related issues and other issues in the wireless communications system 200, a preamble transmission 210 may be appended to an uplink transmission 215 to support coexistence between multiple different radio access technologies in the wireless communications system 200.

By way of example, the UE 115-a may operate according to 4G, 5G radio access technologies without supporting Wi-Fi radio access technologies. In this example, the UE 115-a may be capable of transmitting a Wi-Fi preamble without actually supporting Wi-Fi radio access technologies. Therefore, the UE 115-a supporting 4G, 5G radio access technologies may append a Wi-Fi preamble to NR-U communications. As a result, the UE 115-a may support coexistence between multiple different radio access technologies. For example, the UE 115-a may enable a fair channel contention for other UEs (e.g., Wi-Fi devices) attempting to coexist with UEs (e.g., 4G, 5G devices) on a same channel in the wireless communications system 200. While preamble transmissions from the base station 105-a have little to no impact on the wireless communications system 200 performance, preamble transmissions from the UE 115-a may pose certain challenges and have an undesirable impact (e.g., interference, latency) in the wireless communications system 200, as outlined below.

First, a Wi-Fi preamble may signal that the UE 115-a will begin an uplink transmission before other UEs (not shown in the wireless communications system 200). These other UEs (not shown in the wireless communications system 200) may not transmit a preamble transmission or may transmit a shorter preamble transmission compared to the UE 115-a, for example, related to same time and frequency resources for a physical uplink shared channel (PUSCH). As a result, the Wi-Fi preamble transmission from the UE 115-a may block uplink transmissions from other UEs that my not use preamble transmissions. In addition, a Wi-Fi preamble transmission from the UE 115-a may cause interference to other UEs, that are transmitting in a previous resource (e.g., mini-slot, slot) than the one on which the UE 115-a is scheduled, when the base station 105-a (e.g., network scheduler) is unaware of the Wi-Fi preamble transmission from the UE 115-a.

Second, in some examples, if other UEs in addition to the UE 115-a transmit a Wi-Fi preamble transmission (e.g., due to FDM scheduling of UEs) then the base station 105-a (or an access point (AP) in a WLAN) may be unable to decode the Wi-Fi preamble transmission. An example Wi-Fi preamble may include a legacy preamble portion and a non-legacy preamble portion. The legacy preamble portion may include a set of fields, which may include, for example, an L-STF field, an L-LTF field, and L-SIG field. The L-STF field and the L-LTF field may be common to all UEs, while the L-SIG field, VHT-SIG-A field, HE-SIG-A field, etc., may include UE specific information. Thereby, channel estimation output from the L-LTF field may be impractical for the base station 105-a (or an AP in a WLAN) for decoding the L-SIG field, as a result rendering the Wi-Fi preamble transmission from the UEs (including UE 115-a) useless.

The non-legacy preamble portion may be formatted as a very high throughput (VHT) preamble in accordance with the IEEE 802.11ac amendment to the IEEE 802.11 standard. Alternatively, the non-legacy preamble portion may be formatted as a high efficiency (HE) frame in accordance with the IEEE 802.11ax amendment to the IEEE 802.11 standard. The non-legacy preamble portion may include a set of fields, one which may include a VHT signaling field (VHT-SIG-A) or an HE signaling field (HE-SIG-A). Both may provide coexistence information to other UEs that are nearby (not shown) the UE 115-a.

The Wi-Fi preamble (e.g., 802.11ac/ax preambles) may include certain fields that may further support coexistence in the wireless communications system 200. For example, one field in the Wi-Fi preamble may include bandwidth information (e.g., 20 MHz, 40 MHz, 80 MHz), which may be useful when the UE 115-a transmits on more than one sub-band simultaneously. However, if the UE 115-a uses a combination not supported by the 802.11ac/ax preambles, supporting coexistence may be challenging or unfeasible. Another example field may be an RL-SIG field, which may be a repetition of an L-SIG field, providing added coverage and enhanced decoding of the L-SIG field. This may be useful to silence hidden nodes (e.g., UEs (not shown)) near the base station 105-a that may interfere with uplink transmission reception at the base station 105-a. While the RL-SIG field may provide robust decoding for the L-SIG field, because the L-SIG field has a single parity bit, there may be occasions where the L-SIG field is falsely decoded. To improve the use of a Wi-Fi preamble, the UE 115-a may configure or use a set of reserved bits to indicate a device type of the UE 115-a to other UEs (not shown). For example, the set of reserved bits may indicate that the preamble waveform was transmitted by an NR-U device.

Third, in some examples, either or both the base station 105-a and the UE 115-a may apply a power control scheme to an NR-U preamble. Applying a power control scheme to a Wi-Fi preamble, however, may have adverse effects to benefits of using Wi-Fi preambles. Nevertheless, if no power control scheme is applied to the Wi-Fi preamble, then the UE 115-*a* may have to vary its transmit power, for example, between Wi-Fi preamble transmissions (e.g., when operating according to Wi-Fi radio access technology) and PUSCH transmissions (e.g., when operating according to 4G, 5G radio access technologies). Fourth, the UE 115-*a* may have to refrain from transmitting a Wi-Fi preamble during a transmission opportunity (TxOP) of the base station 105-*a*. As a result, the UE 115-*a* may have to be aware of TxOP for the Wi-Fi preamble transmission.

To alleviate the certain challenges outlined above, the base station 105-*a* may configure the UE 115-*a* with a preamble configuration. In some examples, the base station 105-*a* may configure whether or not the UE 115-*a* can transmit the preamble transmission 210. If the UE 115-*a* is configured to transmit the preamble transmission 210, the UE 115-*a* may be configured to indicate the format of the preamble transmission 210 (e.g., 802.11a/ac/ax preambles), which may also be band-specific (e.g., 802.11a preamble in 5 GHz band, 802.11ax preamble in 6 GHz band). Additionally, the base station 105-*a* may configure the UE 115-*a* with scheduling information (e.g., time and frequency resources related to the preamble transmission 210). The base station 105-*a* may provide the scheduling information via a dynamic downlink control information-based indication, or via uplink channel configuration, etc. In some examples, the scheduling information may be rule-based. For example, the UE 115-*a* may transmit the preamble transmission 210 to the base station 105-*a* based on the preamble transmission 210 being scheduled on a full bandwidth or a partial bandwidth. Additionally, or alternatively, the UE 115-*a* may transmit the preamble transmission 210 to the base station 105-*a* outside the TxOP of the base station 105-*a*.

In some examples, the base station 105-*a* may determine a length (e.g., duration) for the preamble transmission 210. The base station 105-*a* may indicate this to the UE 115-*a* via separate signaling. For example, this signaling may occur separate from UE scheduled time to avoid single frequency network (SFN) effects. The base station 105-*a* may also determine and transmit an indication of whether a transmit power setting and a beamforming matrix configured for PUSCH applies to Wi-Fi preambles. For example, when using multiple antennas, Wi-Fi preambles may be transmitted according to a cyclic delay diversity (CDD) or according to a beamformed manner. Lastly, the base station 105-*a* may determine an energy detection threshold for the UE 115-*a* to use for channel access. For example, for an uplink transmission, the energy detection threshold may be −62 dBm with a Wi-Fi preamble or −72 dBm without a Wi-Fi preamble.

Accordingly, the techniques described herein may provide improvements in preamble transmission configuration. Furthermore, the techniques described herein may provide benefits and enhancements to the operation of the UE 115-*a*. For example, by providing a preamble configuration to the UE 115-*a*, the operational characteristics, such as power consumption, processor utilization, and memory usage of the UE 115-*a* may be reduced. The techniques described herein may also provide efficiency to the UE 115-*a* by reducing latency associated with processes related to wireless communications, and more specifically to preamble transmissions appended to uplink transmissions.

Figure 3:
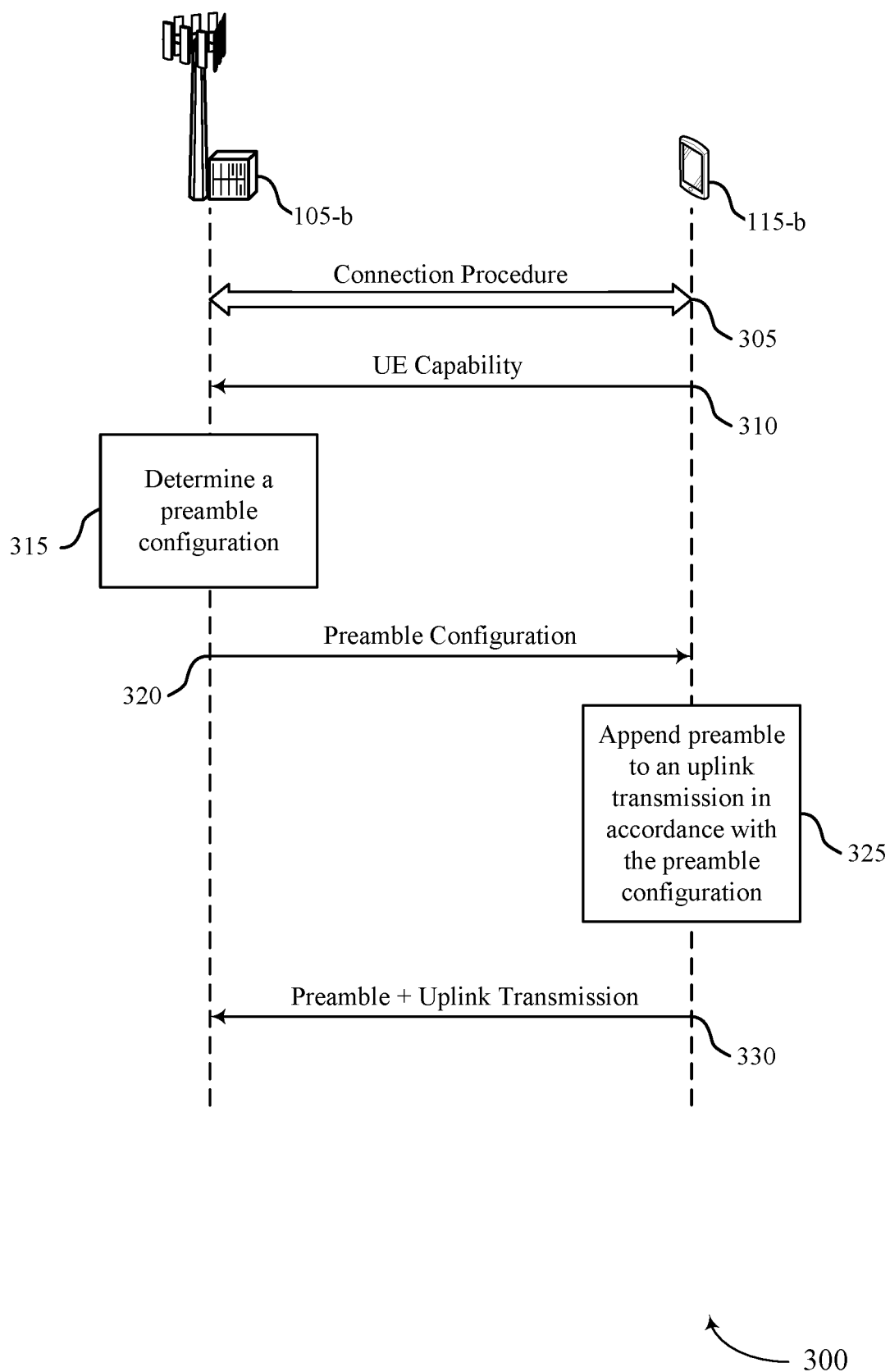
FIG. 3 illustrates an example of a process flow that supports preamble transmission configuration in accordance with aspects of the present disclosure.

FIG. 3 illustrates an example of a process flow 300 that supports preamble transmission configuration in accordance with aspects of the present disclosure. The process flow 300 may include a base station 105-*b* and a UE 115-*b*, which may be examples of the corresponding devices described with reference to FIGS. 1 and 2. In some examples, the process flow 300 may implement aspects of wireless communications systems 100 and 200. For example, the base station 105-*b* or the UE 115-*b*, or both may support preamble transmission configuration to mitigate coexistence-related challenges.

In the following description of the process flow 300, the operations between the base station 105-*b* and the UE 115-*b* may be transmitted in a different order than the exemplary order shown, or the operations performed by the base station 105-*b* and the UE 115-*b* may be performed in different orders or at different times. Certain operations may also be left out of the process flow 300, or other operations may be added to the process flow 300.

At 305, the process flow 300 may commence with the base station 105-*b* and the UE 115-*b* performing a connection procedure (e.g., performing an access procedure, a cell acquisition procedure, a random access procedure, a radio resource control connection procedure, a radio resource control configuration procedure). In some examples, either or both the base station 105-*b* and the UE 115-*b* may be configured with multiple antennas, which may be used for directional or beamformed transmissions.

At 310, the UE 115-*b* may transmit UE capability to the base station 105-*b*. In some examples, the UE 115-*b* may transmit UE capability to the base station 105-*b*, as part of the connection procedure. The UE capability may include an indication that the UE 115-*b* is capable of appending a preamble waveform to an uplink transmission to the base station 105-*b*. The UE 115-*b* may also provide additional UE capability-related information. In some examples, the UE 115-*b* may provide an indication of a version of the preamble waveform or an indication that the UE 115-*b* dynamically selects a version of the preamble waveform from a set of preamble waveforms. For example, the UE 115-*b* may indicate to the base station 105-*b* that it has the capability to transmit a Wi-Fi preamble or a NR-U preamble. Alternatively, the UE 115-*b* may simply provide an indication of a length of the preamble waveform without indicating the version of the preamble waveform. In this case, the base station 105-*b* may be unaware of what the waveform is and may be simply aware that something will be transmitted. The length of the preamble waveform may satisfy a threshold length. For example, a length of a preamble waveform may be no longer than X micro-seconds (us), where X is a positive value.

At 315, the base station 105-*b* may determine a preamble configuration. In some examples, as part of the connection procedure and upon receiving the UE capability, the base station 105-*b* may determine the preamble configuration using the UE capability. The base station 105-*b* may determine whether the UE 115-*a* is capable of appending a preamble waveform to an uplink transmission. Based on this determination, the base station 105-*b* may include in the preamble configuration an indication that the UE 115-*b* is permitted to append the preamble waveform to the uplink transmission. In some examples, the base station 105-*b* may determine a format of the preamble waveform. For example, the UE capability may include a device type of the UE 115-*b* (e.g., a Wi-Fi type, a NR type, an LTE type). Based on the device type, the base station 105-*b* may determine and select a format of the preamble waveform (e.g., a Wi-Fi preamble, a NR-U preamble). In accordance with this determination, the base station 105-*b* may include in the preamble configuration an indication of a format of the preamble waveform.

The base station 105-*b* may also determine timing for transmission of the preamble waveform. For example, the base station 105-*b* may determine and include in the preamble configuration an indication of a time at which the UE 115-*b* is permitted to transmit the preamble waveform. Additionally, or alternatively, the timing may be based on an uplink channel configuration of the UE 115-*b* or a bandwidth of the uplink transmission. For example, if the preamble waveform is scheduled on a partial bandwidth, the UE 115-*b* may be unable to transmit the preamble waveform. Otherwise, if the preamble waveform is scheduled on a full bandwidth, the UE 115-*b* may be able to transmit the preamble waveform. Additionally, or alternatively, the base station 105-*b* may determine one or more of its TxOPs. In this example, the timing for transmission of the preamble waveform may be based on the TxOPs of the base station 105-*b*. That is, the time at which the UE 115-*b* is permitted to transmit the preamble waveform may be based on the transmission opportunity of the base station 105-*b*. The timing may be signaled in a duration field value (e.g., associated with a field in a preamble) to the UE 115-*b*.

The base station 105-*b* may also determine whether (or that) a power setting and a beamforming matrix configured for an uplink transmission are applicable to the preamble waveform. Based on this determination, the base station 105-*b* may include in the preamble configuration an indication that the transmit power setting and the beamforming matrix configured for the uplink transmission are applicable to the preamble waveform. In some examples, the base station 105-*b* may also determine an energy detection threshold to use for access to a channel, which the base station 105-*b* may include in the preamble configuration an indication of the energy detection threshold. In some examples, the energy detection threshold may be applicable to the connection procedure.

At 320, the base station 105-*b* may transmit the preamble configuration to the UE 115-*b*. For example, the base station 105-*b* may transmit the preamble configuration to the UE 115-*b* in a downlink control information block, or in a radio resource control message as part of the connection procedure. At 325, the UE 115-*b* may append a preamble to an uplink transmission in accordance with the preamble configuration. For example, the UE 115-*b* may receive the preamble configuration and determine, based on the preamble configuration, whether the UE 115-*b* is permitted to append the preamble waveform to the uplink transmission.

The UE 115-*b* may in some examples receive the preamble configuration and determine, based on the preamble configuration, a format of the preamble waveform. Additionally, or alternatively, the UE 115-*b* may receive the preamble configuration and determine, based on the preamble configuration, a time at which the UE 115-*b* is permitted to transmit the preamble waveform. According to the preamble configuration, the UE 115-*b* may generate a preamble waveform and append the preamble waveform to an uplink transmission. At 330, the UE 115-*b* may transmit an uplink transmission to the base station 105-*b*, where the preamble waveform is appended to a beginning of the uplink transmission.

Accordingly, either or both the bases station 105-*b* and UE 115-*b* may support preamble transmission configuration to support coexistence. As explained herein, some benefits of this technique may include enhanced efficiency (e.g., operational characteristics, such as power consumption, processor utilization, and memory usage), and improved signaling of the preamble transmission configuration with minimal messaging overhead.

Figure 4:
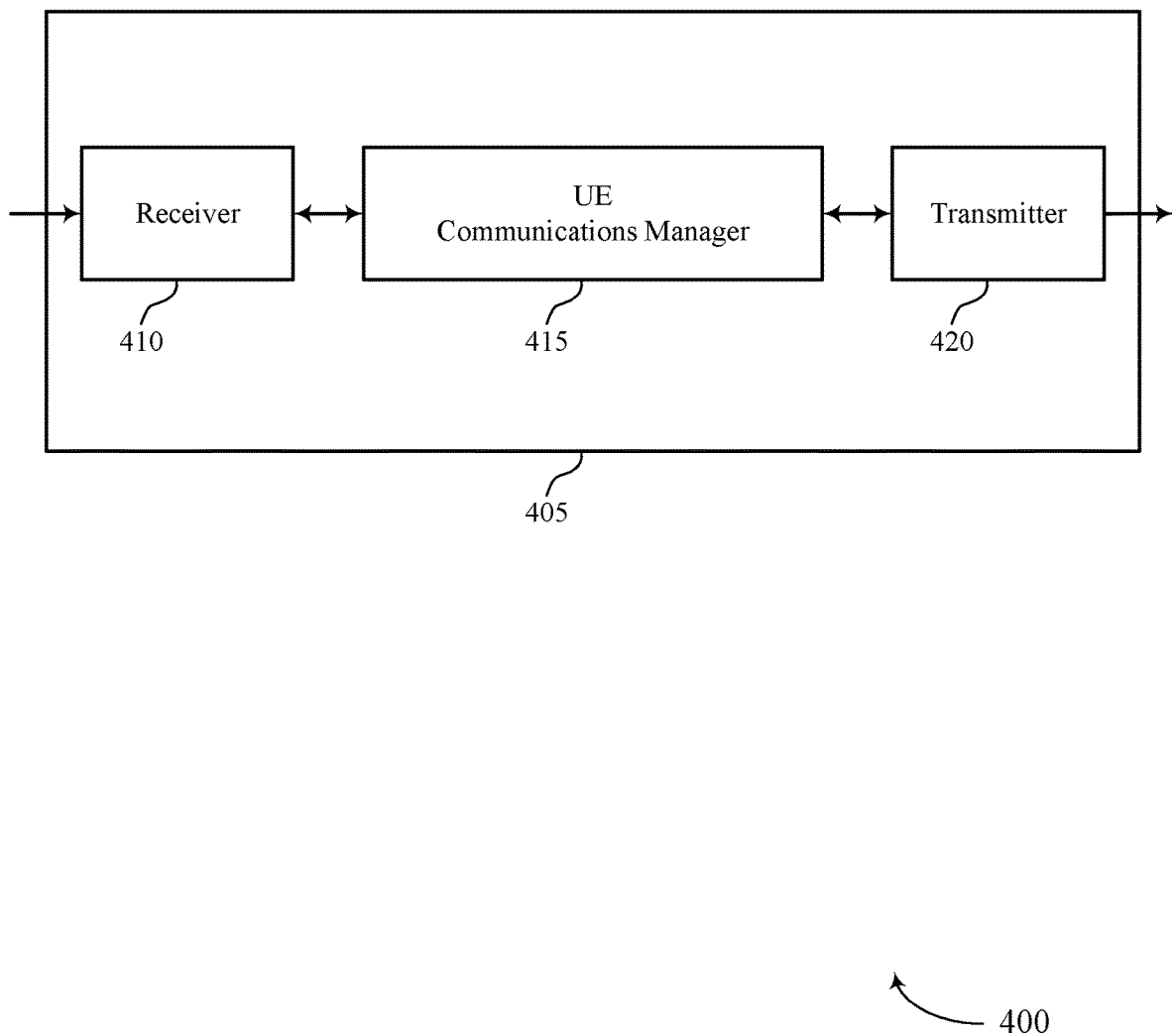
FIGS. 4 and 5 show block diagrams of devices that support preamble transmission configuration in accordance with aspects of the present disclosure.

FIG. 4 shows a block diagram 400 of a device 405 that supports preamble transmission configuration in accordance with aspects of the present disclosure. The device 405 may be an example of aspects of a UE 115 as described herein. The device 405 may include a receiver 410, a UE communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to preamble transmission configuration, etc.). Information may be passed on to other components of the device 405. The receiver 410 may be an example of aspects of the transceiver 720 described with reference to FIG. 7. The receiver 410 may utilize a single antenna or a set of antennas.

The UE communications manager 415 may transmit a first message to a base station, the first message indicating a UE capability to append a preamble waveform to an uplink transmission to the base station, where the preamble waveform is directed at a device (e.g., a device other than the base station, the base station, or both), append the preamble waveform to a second message for transmission to the base station based on the indicated UE capability, and transmit the second message with the appended preamble waveform. The UE communications manager 415 may also receive from a base station, a preamble configuration for uplink transmissions, generate, based on the preamble configuration, a preamble waveform directed to a device, and perform an uplink transmission to the base station, where the preamble waveform is appended to a beginning of the uplink transmission based on the preamble configuration. The UE communications manager 415 may be an example of aspects of the UE communications manager 710 described herein.

The UE communications manager 415, or its sub-components, may be implemented in hardware, code (e.g., software or firmware) executed by a processor, or any combination thereof. If implemented in code executed by a processor, the functions of the UE communications manager 415, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The UE communications manager 415, or its sub-components, may be physically located at various positions, including being distributed such that portions of functions are implemented at different physical locations by one or more physical components. In some examples, the UE communications manager 415, or its sub-components, may be a separate and distinct component in accordance with various aspects of the present disclosure. In some examples, the UE communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

Figure 5:
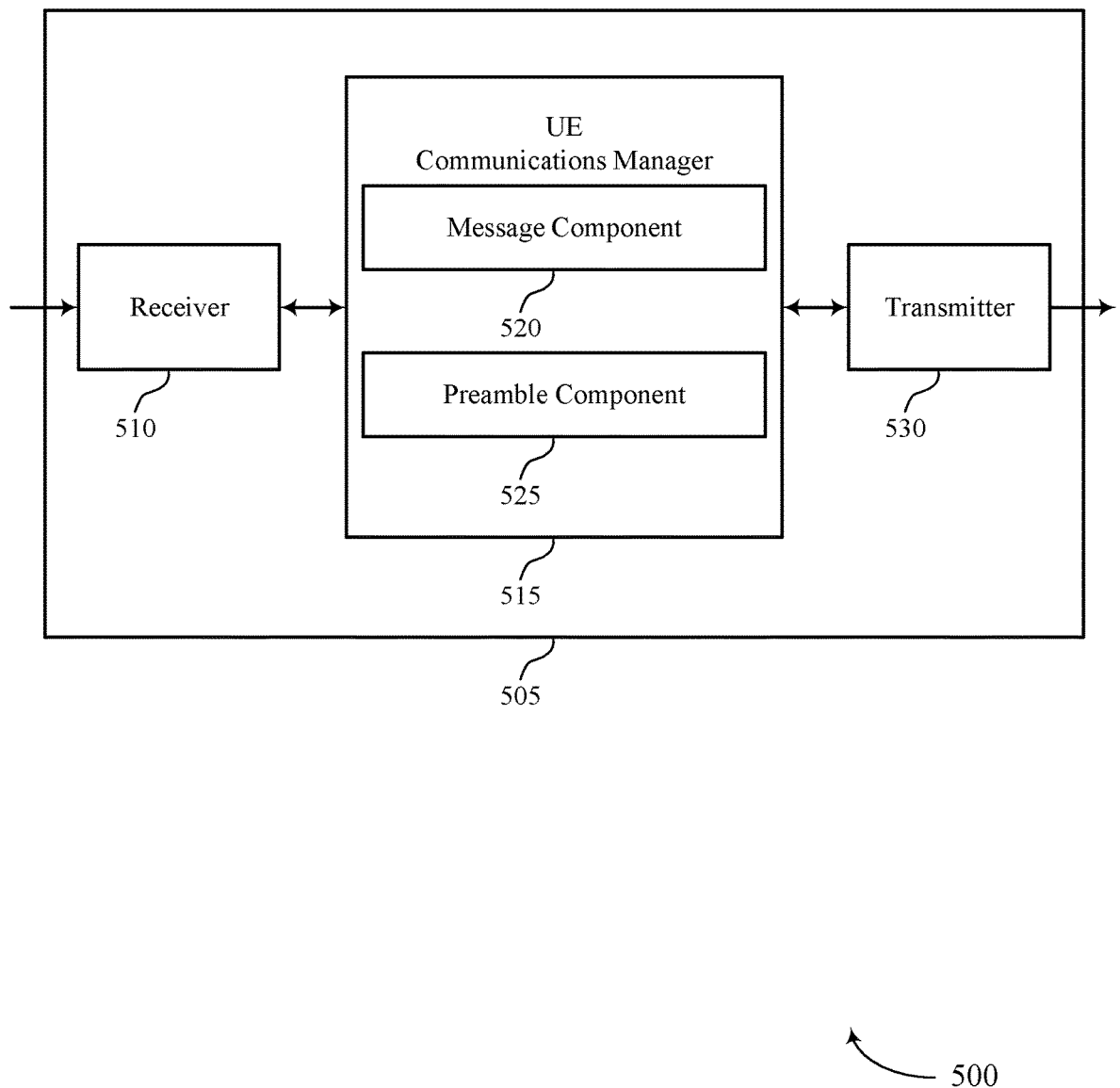

FIG. 5 shows a block diagram 500 of a device 505 that supports preamble transmission configuration in accordance with aspects of the present disclosure. The device 505 may be an example of aspects of a device 405, or a UE 115 as described herein. The device 505 may include a receiver 510, a UE communications manager 515, and a transmitter 530. The device 505 may also include a processor. Each of these components may be in communication with one another (e.g., via one or more buses).

The receiver 510 may receive information such as packets, user data, or control information associated with various information channels (e.g., control channels, data channels, and information related to preamble transmission configuration, etc.). Information may be passed on to other components of the device 505. The receiver 510 may be an example of aspects of the transceiver 720 described with reference to FIG. 7. The receiver 510 may utilize a single antenna or a set of antennas.

The UE communications manager 515 may be an example of aspects of the UE communications manager 415 as described herein. The UE communications manager 515 may include a message component 520 and a preamble component 525. The UE communications manager 515 may be an example of aspects of the UE communications manager 710 described herein.

The message component 520 may transmit a first message to a base station, the first message indicating a UE capability to append a preamble waveform to an uplink transmission to the base station, where the preamble waveform is directed at a device (e.g., a device other than the base station, the base station, or both) and transmit a second message with the appended preamble waveform. The preamble component 525 may append the preamble waveform to the second message for transmission to the base station based on the indicated UE capability. The preamble component 525 may receive from a base station, a preamble configuration for uplink transmissions and generate, based on the preamble configuration, the preamble waveform directed to a device. The message component 520 may perform an uplink transmission to the base station, where the preamble waveform is appended to a beginning of the uplink transmission based on the preamble configuration.

The transmitter 530 may transmit signals generated by other components of the device 505. In some examples, the transmitter 530 may be collocated with a receiver 510 in a transceiver module. For example, the transmitter 530 may be an example of aspects of the transceiver 720 described with reference to FIG. 7. The transmitter 530 may utilize a single antenna or a set of antennas.

Figure 6:
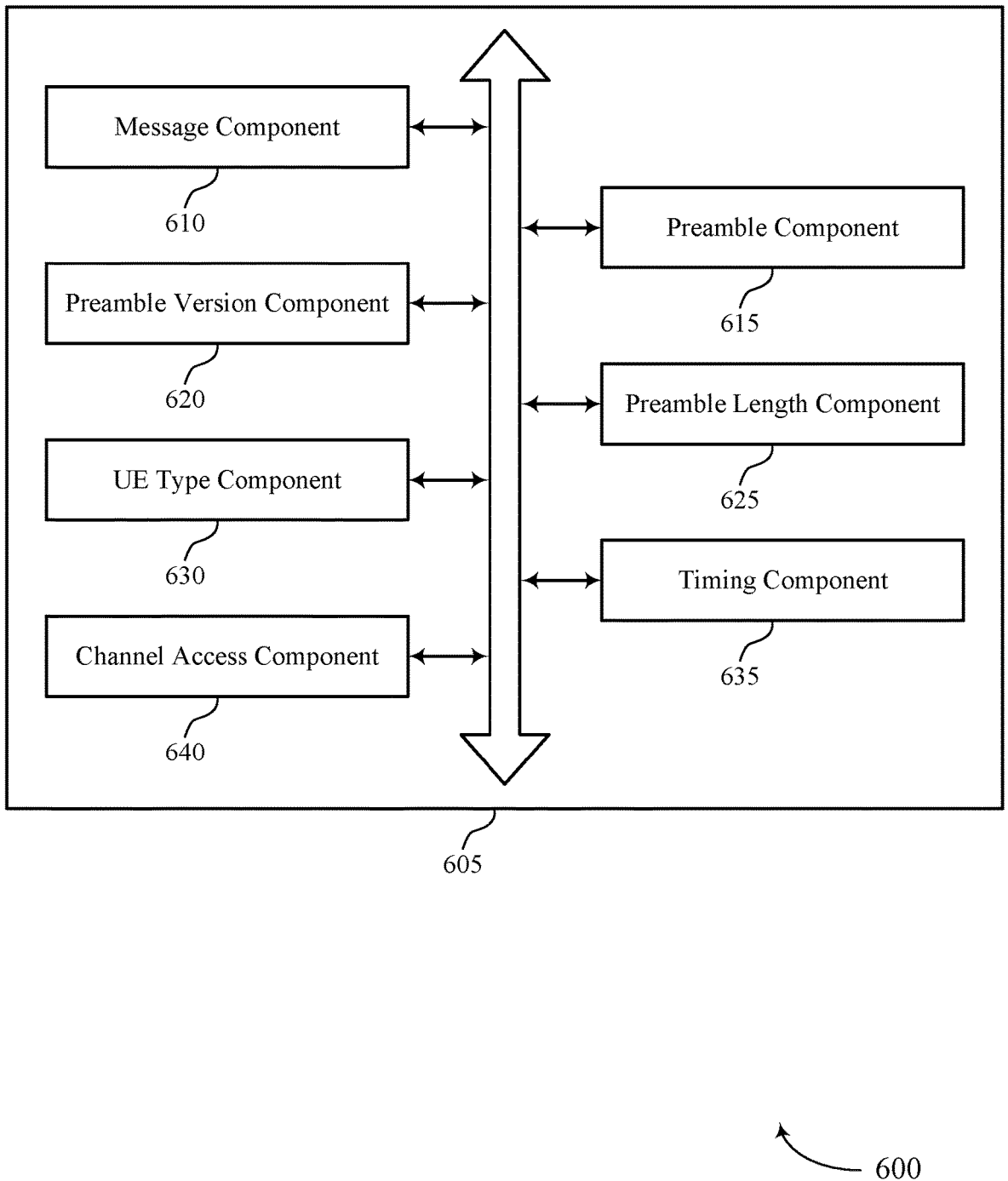
FIG. 6 shows a block diagram of a communications manager that supports preamble transmission configuration in accordance with aspects of the present disclosure.

FIG. 6 shows a block diagram 600 of a UE communications manager 605 that supports preamble transmission configuration in accordance with aspects of the present disclosure. The UE communications manager 605 may be an example of aspects of a UE communications manager 415, a UE communications manager 515, or a UE communications manager 710 described herein. The UE communications manager 605 may include a message component 610, a preamble component 615, a preamble version component 620, a preamble length component 625, a UE type component 630, a timing component 635, and a channel access component 640. Each of these modules may communicate, directly or indirectly, with one another (e.g., via one or more buses).

The message component 610 may transmit a first message to a base station, the first message indicating a UE capability to append a preamble waveform to an uplink transmission to the base station, where the preamble waveform is directed at a device (e.g., a device other than the base station, the base station, or both). The message component 610 may perform an uplink transmission to the base station, where the preamble waveform is appended to a beginning of the uplink transmission based on the preamble configuration. In some examples, the message component 610 may transmit a second message with the appended preamble waveform.

The preamble component 615 may append the preamble waveform to the second message for transmission to the base station based on the indicated UE capability. In some examples, the preamble component 615 may receive from a base station, a preamble configuration for uplink transmissions. In some examples, the preamble component 615 may determine, based on the preamble configuration, whether the UE is permitted to append the preamble waveform to the uplink transmission, where performing the uplink transmission to the base station is based on the determination. In some examples, the preamble component 615 may receive an indication that a transmit power setting and a beamforming matrix configured for the uplink transmission are applicable to the preamble waveform, where the uplink transmission includes transmitting the preamble waveform according to the transmit power setting and using the beamforming matrix. The preamble component 615 may generate, based on the preamble configuration, a preamble waveform directed to a device. In some examples, the preamble component 615 may receive an indication of a duration field value from the base station, where generating the preamble waveform includes signaling the indicated duration field value in the preamble waveform.

The preamble version component 620 may include in the first message an indication of a version of the preamble waveform, where the preamble waveform appended to the second message is of the indicated version. In some examples, the preamble version component 620 may include in the first message an indication that the UE dynamically selects a version of the preamble waveform, where appending the preamble waveform to the second message includes dynamically selecting the version of the preamble waveform. In some examples, the preamble version component 620 may determine, based on the preamble configuration, a format of the preamble waveform, where generating the preamble waveform is based on the determined format.

The preamble length component 625 may include in the first message an indication of a length of the preamble waveform. The UE type component 630 may include in the Wi-Fi preamble an indication of a device type of the UE. The timing component 635 may determine, based on the preamble configuration, a time at which the UE is permitted to transmit the preamble waveform, where generating the preamble waveform is based on the determined time. In some examples, the timing component 635 may receive an indication of a transmission opportunity of the base station; where determining the time at which the UE is permitted to transmit the preamble waveform is further based at least in part on the transmission opportunity of the base station. The channel access component 640 may determine, based on the preamble configuration, an energy detection threshold to use for access to a channel. In some examples, the channel access component 640 may perform a channel access procedure based on the determined energy detection threshold.

Figure 7:
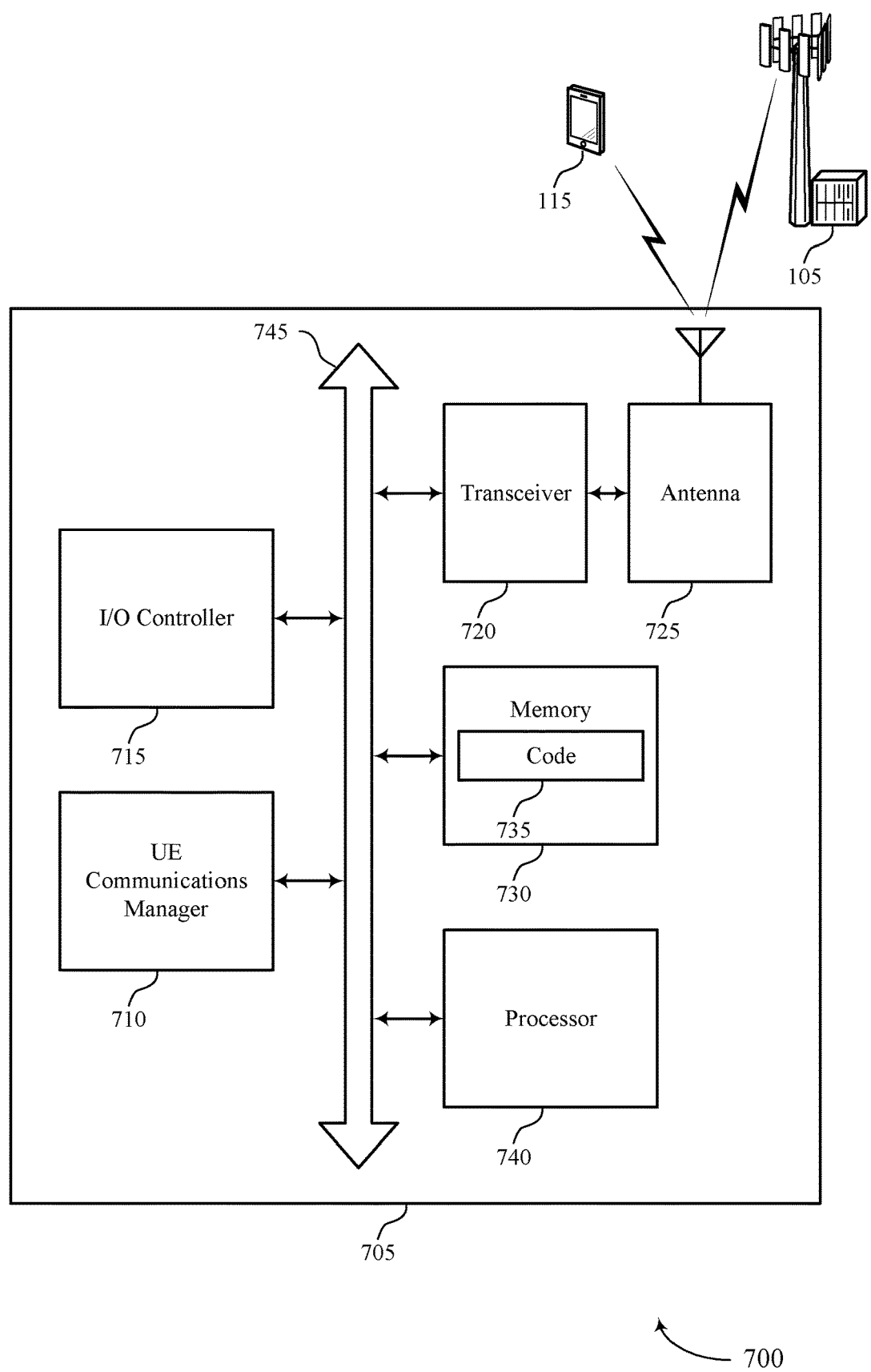
FIG. 7 shows a diagram of a system including a device that supports preamble transmission configuration in accordance with aspects of the present disclosure.

FIG. 7 shows a diagram of a system 700 including a device 705 that supports preamble transmission configuration in accordance with aspects of the present disclosure. The device 705 may be an example of or include the components of device 405, device 505, or a UE 115 as described herein. The device 705 may include components for bi-directional voice and data communications including components for transmitting and receiving communications, including a UE communications manager 710, an I/O controller 715, a transceiver 720, an antenna 725, memory 730, and a processor 740. These components may be in electronic communication via one or more buses (e.g., bus 745).

The UE communications manager 710 may transmit a first message to a base station, the first message indicating a UE capability to append a preamble waveform to an uplink transmission to the base station, where the preamble waveform is directed at a device (e.g., a device other than the base station, the base station, or both), append the preamble waveform to a second message for transmission to the base station based on the indicated UE capability, and transmit the second message with the appended preamble waveform. Additionally, or alternatively, the UE communications manager 710 may also receive from a base station, a preamble configuration for uplink transmissions, generate, based on the preamble configuration, a preamble waveform directed to a device, and perform an uplink transmission to the base station, where the preamble waveform is appended to a beginning of the uplink transmission based on the preamble configuration.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described herein. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas. In some cases, the device 705 may include a single antenna 725. However, in some cases the device 705 may have more than one antenna 725, which may be capable of concurrently transmitting or receiving multiple wireless transmissions.

The memory 730 may include random-access memory (RAM) and read-only memory (ROM). The memory 730 may store computer-readable, computer-executable code 735 including instructions that, when executed, cause the processor to perform various functions described herein. In some cases, the memory 730 may contain, among other things, a basic input/output system (BIOS) which may control basic hardware or software operation such as the interaction with peripheral components or devices.

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting preamble transmission configuration).

Figure 8:
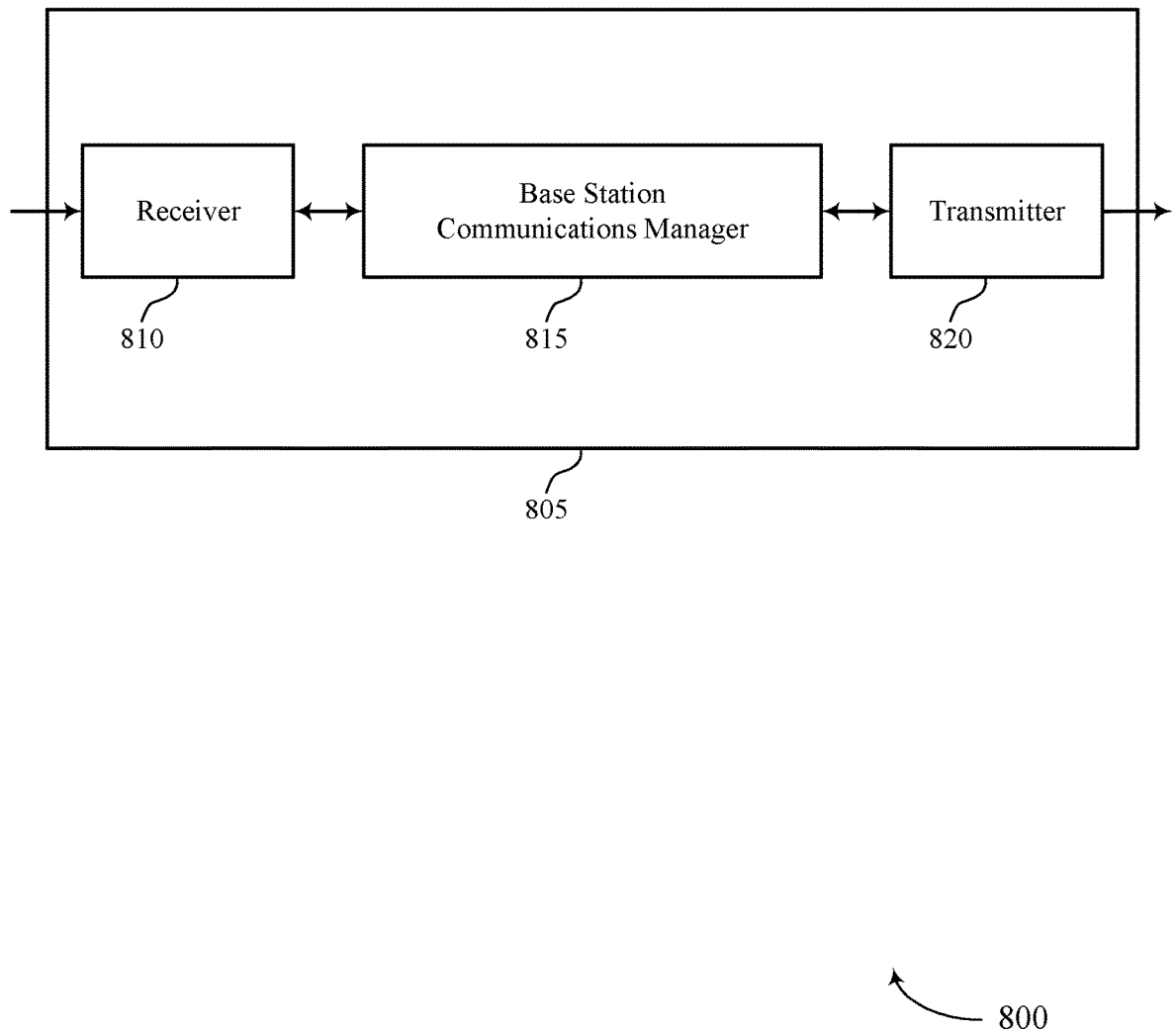
FIGS. 8 and 9 show block diagrams of devices that support preamble transmission configuration in accordance with aspects of the present disclosure.

FIG. 8 shows a block diagram 800 of a device 805 that supports preamble transmission configuration in accordance with aspects of the present disclosure. The device 805 may be an example of aspects of a base station 105 as described herein. The device 805 may include a receiver 810, a base station communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to preamble transmission configuration, etc.). Information may be passed on to other components of the device 805. The receiver 810 may be an example of aspects of the transceiver 1120 described with reference to FIG. 11. The receiver 810 may utilize a single antenna or a set of antennas.

The base station communications manager 815 may receive a first message from a UE, the first message indicating a UE capability to append a preamble waveform to an uplink transmission to the device 805, where the preamble waveform is directed at a device (e.g., a device other than the device 805 and/or including the device 805) and receive a second message with the appended preamble waveform. Additionally, or alternatively, the base station communications manager 815 may transmit to a UE, a preamble configuration including an indication to append a preamble waveform to an uplink transmission, where the preamble waveform is directed at a device other than the device 805, and receive the uplink transmission from the UE, where the preamble waveform is appended to a beginning of the uplink transmission based on the preamble configuration. The base station communications manager 815 may be an example of aspects of the base station communications manager 1110 described herein.

The base station communications manager 815, or its sub-components, may be implemented in hardware, code (e.g., software or firmware) executed by a processor, or any combination thereof. If implemented in code executed by a processor, the functions of the base station communications manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The base station communications manager 815, or its sub-components, may be physically located at various positions, including being distributed such that portions of functions are implemented at different physical locations by one or more physical components. In some examples, the base station communications manager 815, or its sub-components, may be a separate and distinct component in accordance with various aspects of the present disclosure. In some examples, the base station communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
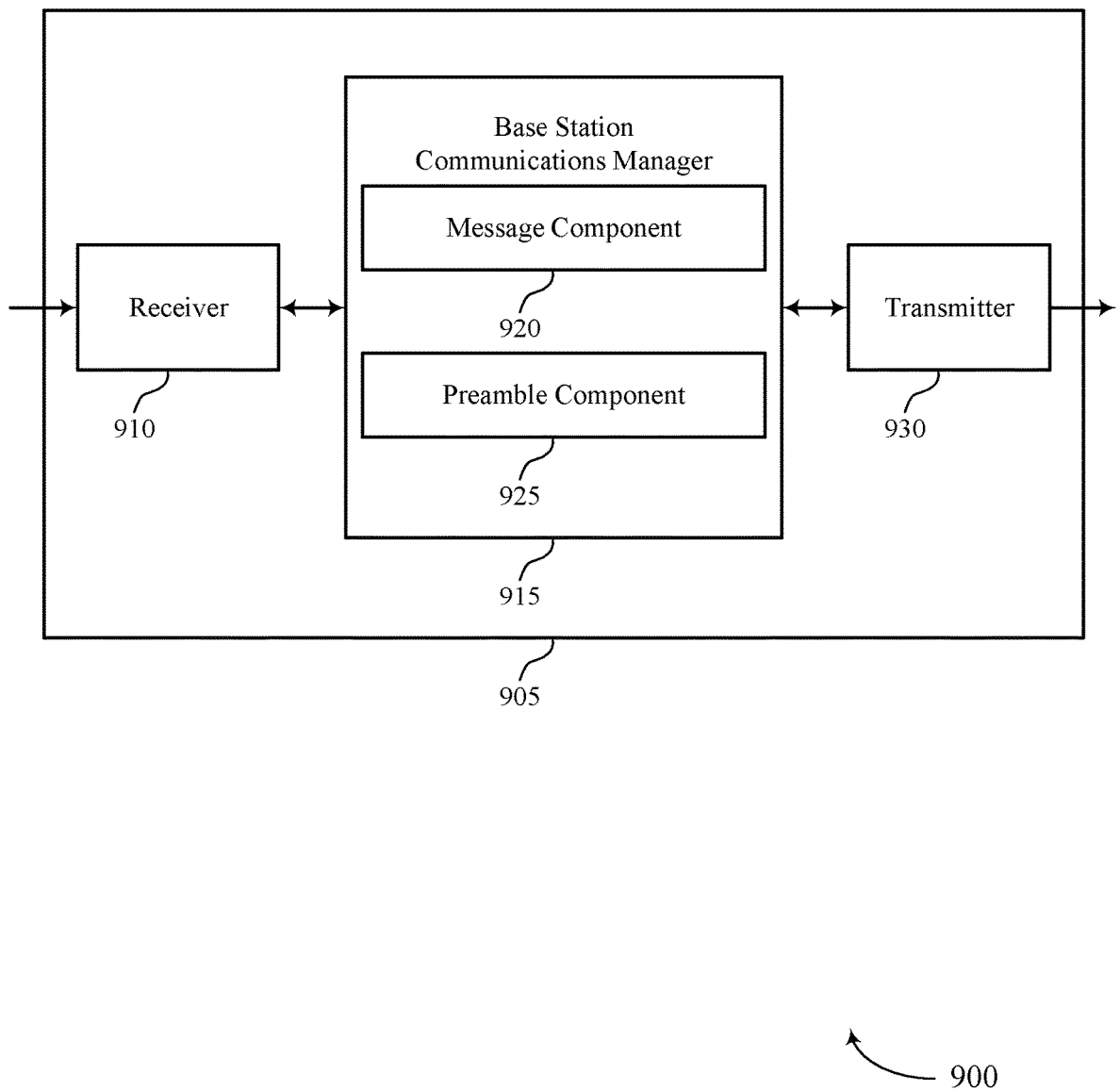

FIG. 9 shows a block diagram 900 of a device 905 that supports preamble transmission configuration in accordance with aspects of the present disclosure. The device 905 may be an example of aspects of a device 805, or a base station 105 as described herein. The device 905 may include a receiver 910, a base station communications manager 915, and a transmitter 930. The device 905 may also include a processor. Each of these components may be in communication with one another (e.g., via one or more buses).

The receiver 910 may receive information such as packets, user data, or control information associated with various information channels (e.g., control channels, data channels, and information related to preamble transmission configuration, etc.). Information may be passed on to other components of the device 905. The receiver 910 may be an example of aspects of the transceiver 1120 described with reference to FIG. 11. The receiver 910 may utilize a single antenna or a set of antennas.

The base station communications manager 915 may be an example of aspects of the base station communications manager 815 as described herein. The base station communications manager 915 may include a message component 920 and a preamble component 925. The base station communications manager 915 may be an example of aspects of the base station communications manager 1110 described herein.

The message component 920 may receive a first message from a UE, the first message indicating a UE capability to append a preamble waveform to an uplink transmission to the device 905, where the preamble waveform is directed at a device other than the device 905, and receive a second message with the appended preamble waveform. The preamble component 925 may transmit to a UE, a preamble configuration including an indication to append a preamble waveform to an uplink transmission, where the preamble waveform is directed at a device other than the device 905. The message component 920 may receive the uplink transmission from the UE, where the preamble waveform is appended to a beginning of the uplink transmission based on the preamble configuration.

The transmitter 930 may transmit signals generated by other components of the device 905. In some examples, the transmitter 930 may be collocated with a receiver 910 in a transceiver module. For example, the transmitter 930 may be an example of aspects of the transceiver 1120 described with reference to FIG. 11. The transmitter 930 may utilize a single antenna or a set of antennas.

Figure 10:
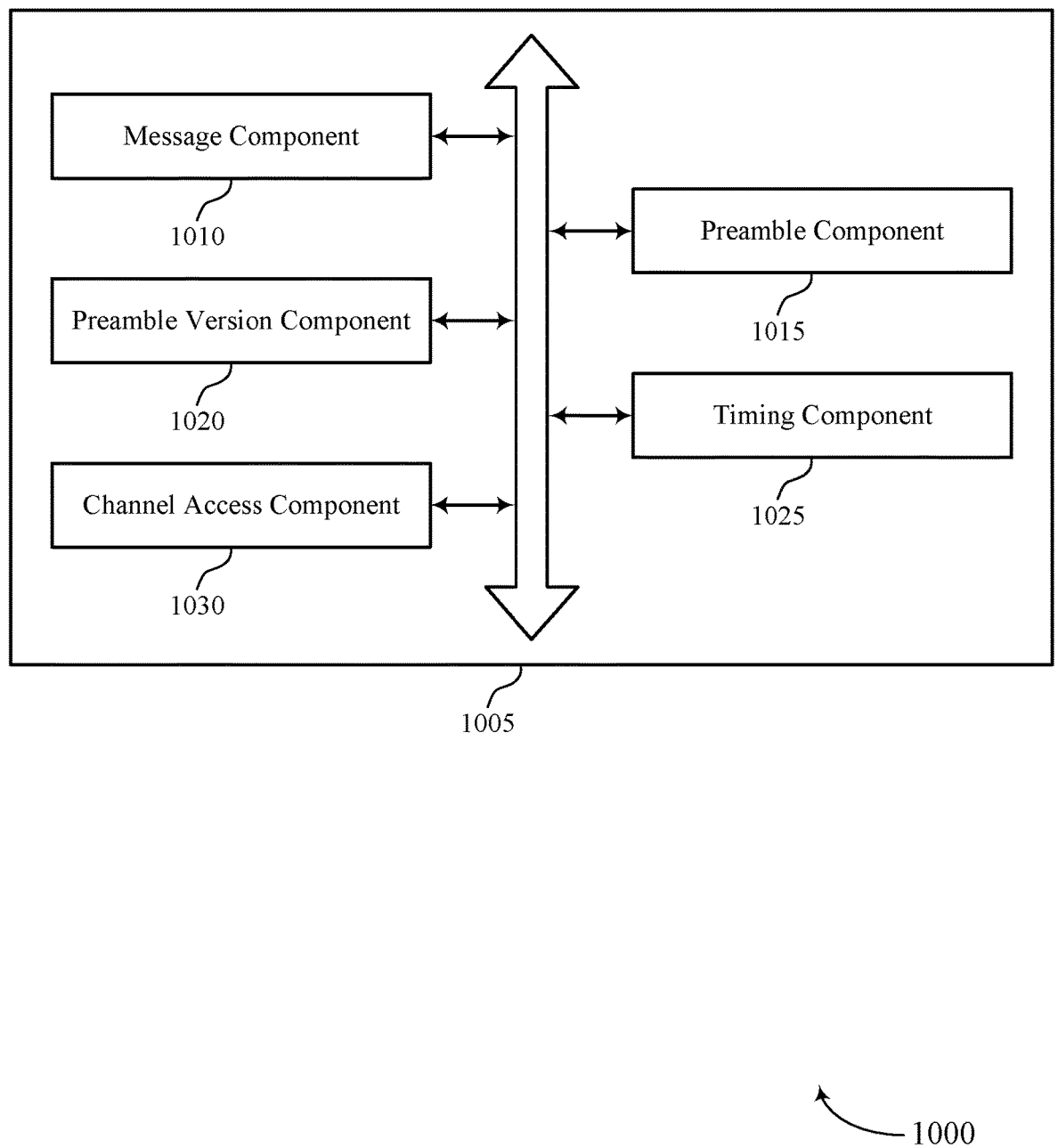
FIG. 10 shows a block diagram of a communications manager that supports preamble transmission configuration in accordance with aspects of the present disclosure.

FIG. 10 shows a block diagram 1000 of a base station communications manager 1005 that supports preamble transmission configuration in accordance with aspects of the present disclosure. The base station communications manager 1005 may be an example of aspects of a base station communications manager 815, a base station communications manager 915, or a base station communications manager 1110 described herein. The base station communications manager 1005 may include a message component 1010, a preamble component 1015, a preamble version component 1020, a timing component 1025, and a channel access component 1030. Each of these modules may communicate, directly or indirectly, with one another (e.g., via one or more buses).

The message component 1010 may receive a first message from a UE, the first message indicating a UE capability to append a preamble waveform to an uplink transmission to a base station (e.g., including the base station communications manager 1005). The preamble waveform may be directed at a device other than the base station (e.g., including the base station communications manager 1005). The message component 1010 may receive the uplink transmission from the UE, where the preamble waveform is appended to a beginning of the uplink transmission based on a preamble configuration. In some examples, the message component 1010 may receive a second message with the appended preamble waveform.

The preamble component 1015 may transmit to a UE, the preamble configuration including an indication to append a preamble waveform to the uplink transmission. In some examples, the preamble component 1015 may include in the preamble configuration an indication that the UE is permitted to append the preamble waveform to the uplink transmission. The preamble component 1015 may transmit an indication of a duration field value to the UE. In some examples, the preamble component 1015 may transmit an indication that a transmit power setting and a beamforming matrix configured for the uplink transmission are applicable to the preamble waveform, where the uplink transmission includes receiving the preamble waveform according to the transmit power setting and using the beamforming matrix. In some examples, the preamble version component 1020 may include in the preamble configuration an indication of a format of the preamble waveform.

The timing component 1025 may include in the preamble configuration an indication of a time at which the UE is permitted to transmit the preamble waveform. In some examples, the timing component 1025 may transmit an indication of a transmission opportunity of the base station to the UE; where the time at which the UE is permitted to transmit the preamble waveform is further based at least in part on the transmission opportunity of the base station (e.g., including the base station communications manager 1005).

The channel access component 1030 may determine, based on the preamble configuration, an energy detection threshold to use for access to a channel. In some examples, the channel access component 1030 may perform a channel access procedure based on the determined energy detection threshold.

Figure 11:
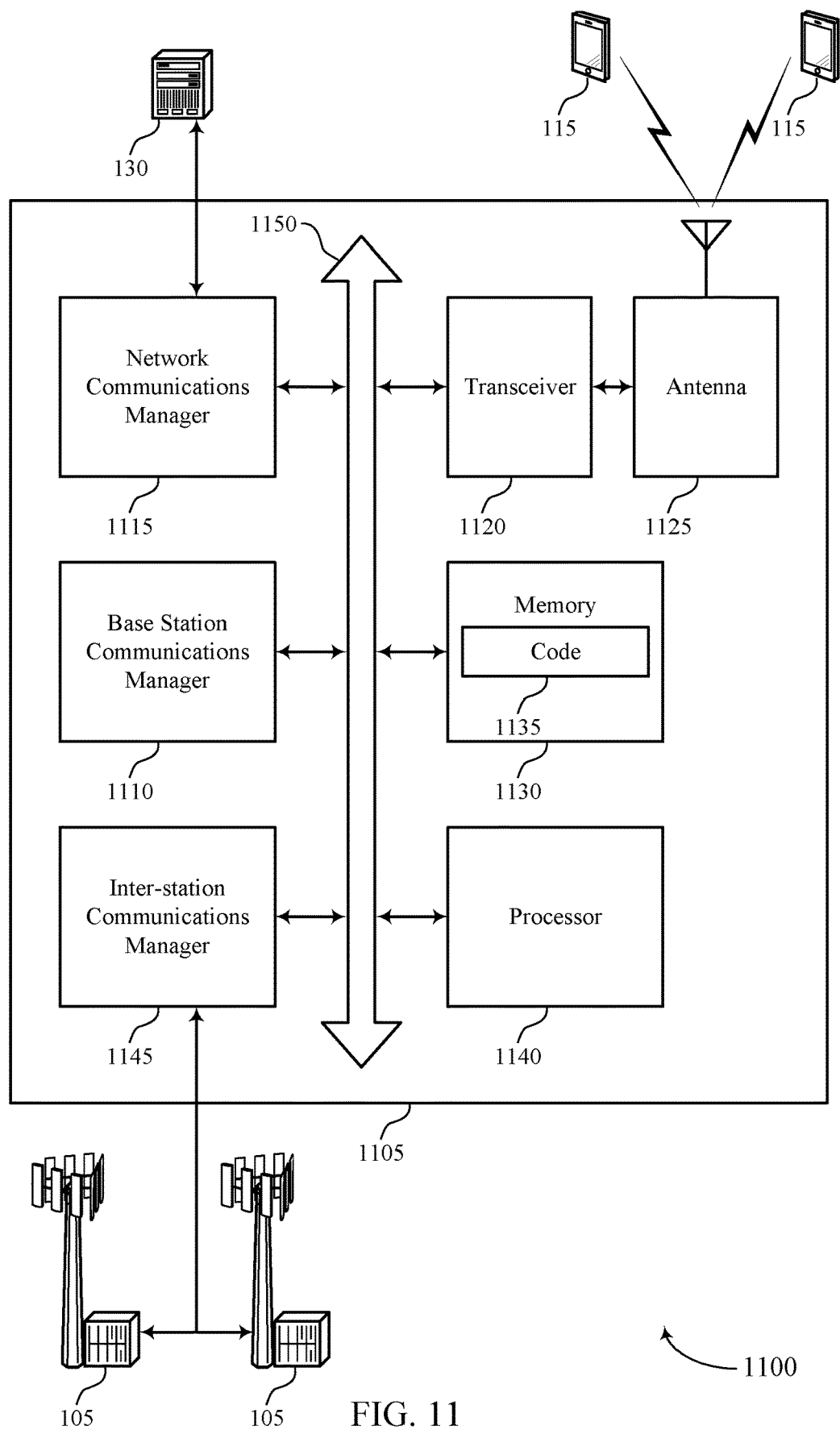
FIG. 11 shows a diagram of a system including a device that supports preamble transmission configuration in accordance with aspects of the present disclosure.

FIG. 11 shows a diagram of a system 1100 including a device 1105 that supports preamble transmission configuration in accordance with aspects of the present disclosure. The device 1105 may be an example of or include the components of device 805, device 905, or a base station 105 as described herein. The device 1105 may include components for bi-directional voice and data communications including components for transmitting and receiving communications, including a base station communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

The base station communications manager 1110 may receive a first message from a UE, the first message indicating a UE capability to append a preamble waveform to an uplink transmission to the device 1105, where the preamble waveform is directed at a device other than the device 1105, and receive a second message with the appended preamble waveform. Additionally, or alternatively, the base station communications manager 1110 may transmit to a UE, a preamble configuration including an indication to append a preamble waveform to an uplink transmission, where the preamble waveform is directed at a device other than the device 1105, and receive the uplink transmission from the UE, where the preamble waveform is appended to a beginning of the uplink transmission based on the preamble configuration.

The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described herein. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas. In some cases, the device 1105 may include a single antenna 1125. However, in some cases the device 1105 may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device 1105 to perform various functions (e.g., functions or tasks supporting preamble transmission configuration).

The inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

Figure 12:
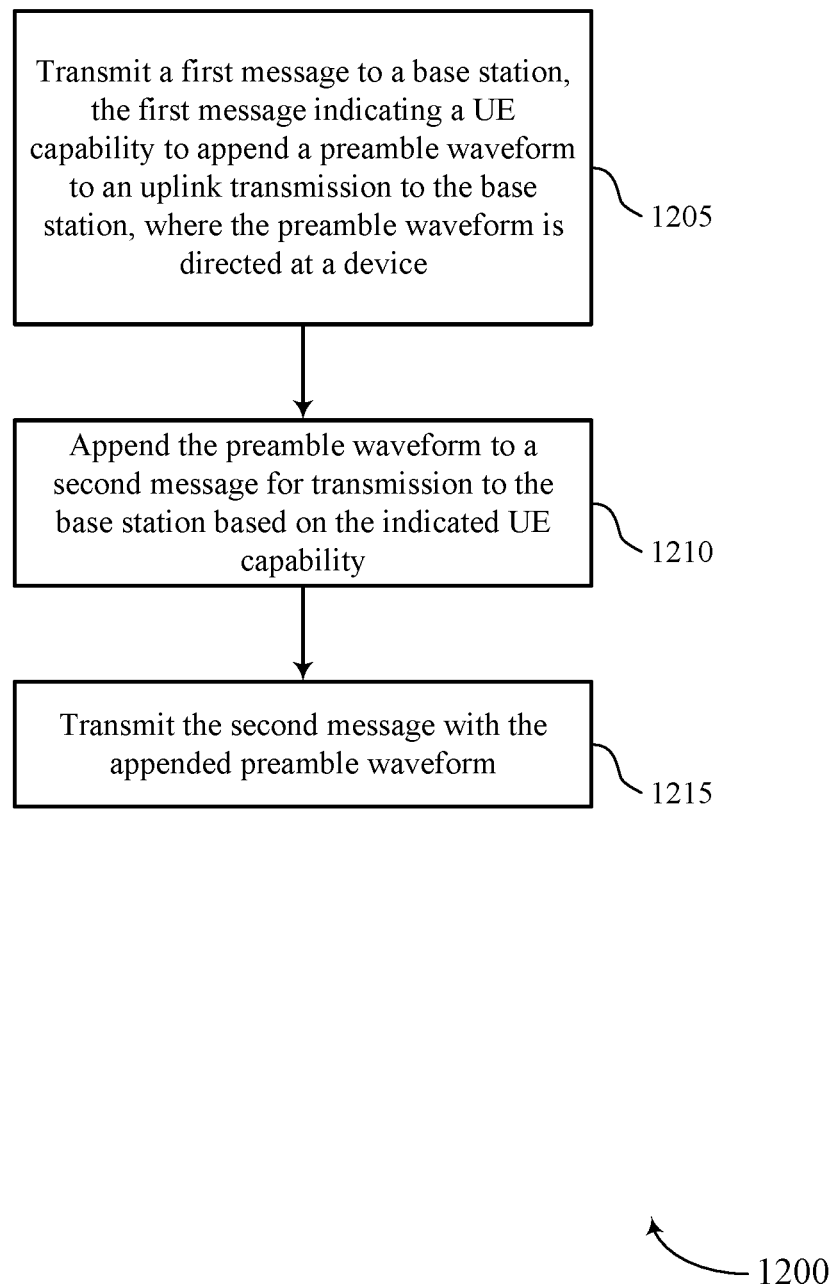
FIGS. 12 through 15 show flowcharts illustrating methods that support preamble transmission configuration in accordance with aspects of the present disclosure.

FIG. 12 shows a flowchart illustrating a method 1200 that supports preamble transmission configuration in accordance with aspects of the present disclosure. The operations of method 1200 may be implemented by a UE 115 or its components as described herein. For example, the operations of method 1200 may be performed by a UE communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1205, the UE may transmit a first message to a base station, the first message indicating a UE capability to append a preamble waveform to an uplink transmission to the base station, where the preamble waveform is directed at a device (e.g., the base station, a device other than the base station, or both). The operations of 1205 may be performed according to the methods described herein. In some examples, aspects of the operations of 1205 may be performed by a message component as described with reference to FIGS. 4 through 7.

At 1210, the UE may append the preamble waveform to a second message for transmission to the base station based on the indicated UE capability. The operations of 1210 may be performed according to the methods described herein. In some examples, aspects of the operations of 1210 may be performed by a preamble component as described with reference to FIGS. 4 through 7.

At 1215, the UE may transmit the second message with the appended preamble waveform. The operations of 1215 may be performed according to the methods described herein. In some examples, aspects of the operations of 1215 may be performed by a message component as described with reference to FIGS. 4 through 7.

Figure 13:
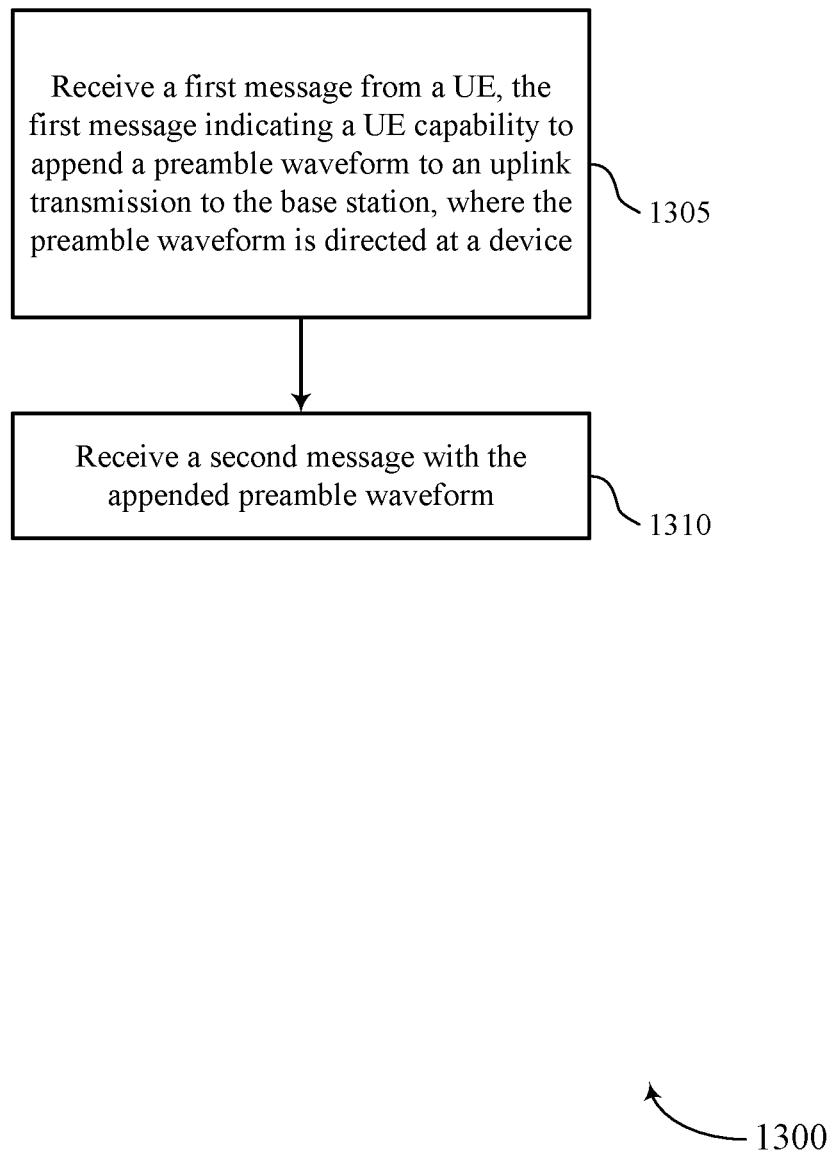

FIG. 13 shows a flowchart illustrating a method 1300 that supports preamble transmission configuration in accordance with aspects of the present disclosure. The operations of method 1300 may be implemented by a base station 105 or its components as described herein. For example, the operations of method 1300 may be performed by a base station communications manager as described with reference to FIGS. 8 through 11. In some examples, a base station may execute a set of instructions to control the functional elements of the base station to perform the functions described herein. Additionally or alternatively, a base station may perform aspects of the functions described herein using special-purpose hardware.

At 1305, the base station may receive a first message from a UE, the first message indicating a UE capability to append a preamble waveform to an uplink transmission to the base station, where the preamble waveform is directed at a device. The operations of 1305 may be performed according to the methods described herein. In some examples, aspects of the operations of 1305 may be performed by a message component as described with reference to FIGS. 8 through 11.

At 1310, the base station may receive a second message with the appended preamble waveform. The operations of 1310 may be performed according to the methods described herein. In some examples, aspects of the operations of 1310 may be performed by a message component as described with reference to FIGS. 8 through 11.

Figure 14:
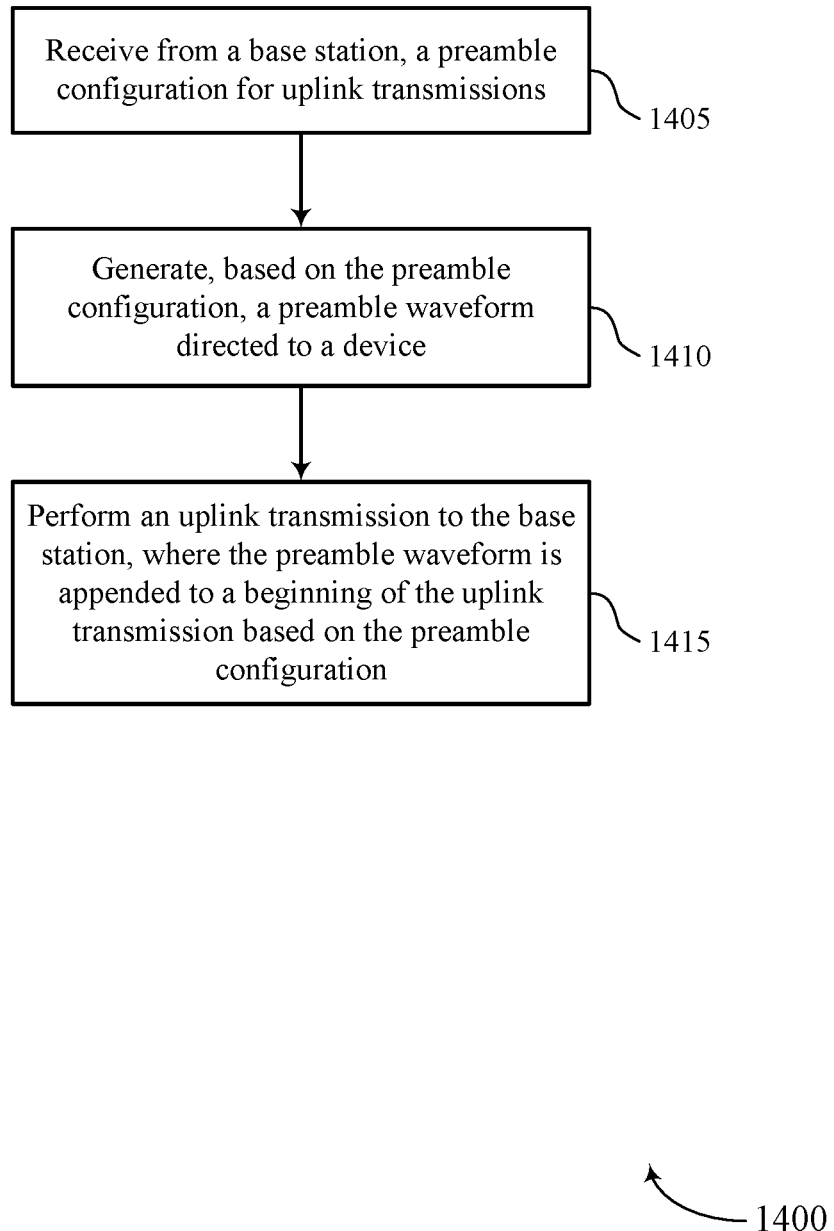

FIG. 14 shows a flowchart illustrating a method 1400 that supports preamble transmission configuration in accordance with aspects of the present disclosure. The operations of method 1400 may be implemented by a UE 115 or its components as described herein. For example, the operations of method 1400 may be performed by a UE communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1405, the UE may receive from a base station, a preamble configuration for uplink transmissions. The operations of 1405 may be performed according to the methods described herein. In some examples, aspects of the operations of 1405 may be performed by a preamble component as described with reference to FIGS. 4 through 7.

At 1410, the UE may generate, based on the preamble configuration, a preamble waveform directed to a device. The operations of 1410 may be performed according to the methods described herein. In some examples, aspects of the operations of 1410 may be performed by a preamble component as described with reference to FIGS. 4 through 7.

At 1415, the UE may perform an uplink transmission to the base station, where the preamble waveform is appended to a beginning of the uplink transmission based on the preamble configuration. The operations of 1415 may be performed according to the methods described herein. In some examples, aspects of the operations of 1415 may be performed by a message component as described with reference to FIGS. 4 through 7.

Figure 15:
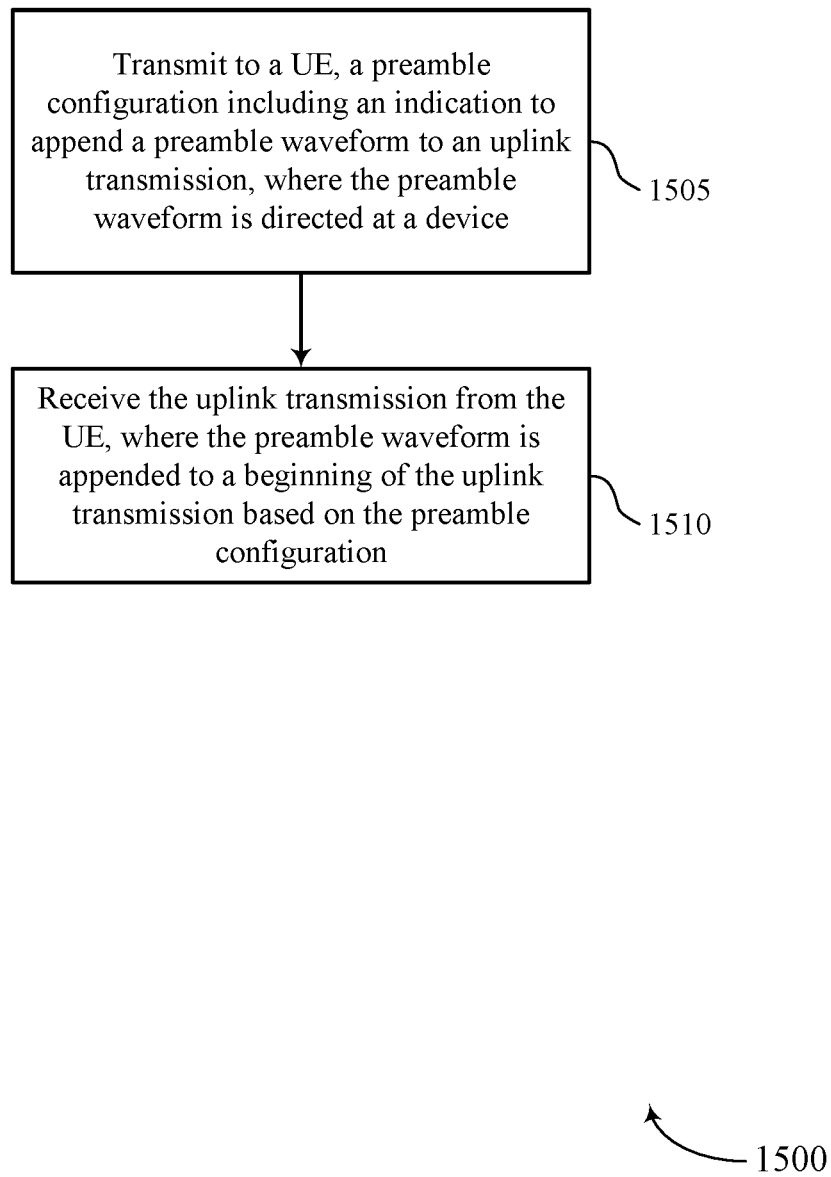

FIG. 15 shows a flowchart illustrating a method 1500 that supports preamble transmission configuration in accordance with aspects of the present disclosure. The operations of method 1500 may be implemented by a base station 105 or its components as described herein. For example, the operations of method 1500 may be performed by a base station communications manager as described with reference to FIGS. 8 through 11. In some examples, a base station may execute a set of instructions to control the functional elements of the base station to perform the functions described herein. Additionally or alternatively, a base station may perform aspects of the functions described herein using special-purpose hardware.

At 1505, the base station may transmit to a UE, a preamble configuration including an indication to append a preamble waveform to an uplink transmission, where the preamble waveform is directed at a device. The operations of 1505 may be performed according to the methods described herein. In some examples, aspects of the operations of 1505 may be performed by a preamble component as described with reference to FIGS. 8 through 11.

At 1510, the base station may receive the uplink transmission from the UE, where the preamble waveform is appended to a beginning of the uplink transmission based on the preamble configuration. The operations of 1510 may be performed according to the methods described herein. In some examples, aspects of the operations of 1510 may be performed by a message component as described with reference to FIGS. 8 through 11.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication, comprising:
a processor;
memory in electronic communication with the processor; and
instructions stored in the memory, wherein the instructions are executable by the processor to:
transmit a first message to a network entity, the first message indicating a user equipment (UE) capability to append a preamble waveform to an uplink transmission to the network entity, wherein the preamble waveform is associated with a first radio access technology and the uplink transmission is associated with a second radio access technology;

append the preamble waveform to the uplink transmission to the network entity based at least in part on the indicated UE capability; and transmit, to the network entity, the uplink transmission with the appended preamble waveform.

2. The apparatus of claim 1, wherein the instructions are further executable by the processor to:

include in the first message an indication of a version of the preamble waveform, wherein the preamble waveform appended to the uplink transmission is of the indicated version.

3. The apparatus of claim 1, wherein the instructions are further executable by the processor to:

include in the first message an indication that the apparatus dynamically selects a version of the preamble waveform, wherein the instructions executable by the processor to append the preamble waveform to the second message uplink transmission comprises instructions executable by the processor to:

dynamically select the version of the preamble waveform.

4. The apparatus of claim 1, wherein the instructions are further executable by the processor to:

include in the first message an indication of a length of the preamble waveform.

5. The apparatus of claim 1, wherein the preamble waveform comprises a Wi-Fi preamble or a new radio unlicensed (NR-U) preamble.

6. The apparatus of claim 5, wherein the instructions are further executable by the processor to:

include in the Wi-Fi preamble an indication of a device type of the UE.

7. An apparatus for wireless communication, comprising:
a processor;
memory in electronic communication with the processor; and
instructions stored in the memory, wherein the instructions are executable by the processor to:

receive a first message from a user equipment (UE), the first message indicating a UE capability to append a preamble waveform to an uplink transmission to the apparatus, wherein the preamble waveform is associated with a first radio access technology and the uplink transmission is associated with a second radio access technology; and receive the uplink transmission with the appended preamble waveform.

8. The apparatus of claim 7, wherein the first message comprises an indication of a version of the preamble waveform, wherein the preamble waveform appended to the uplink transmission is of the indicated version.

9. The apparatus of claim 7, wherein the first message comprises an indication that the UE dynamically selects a version of the preamble waveform.

10. The apparatus of claim 7, wherein the first message comprises an indication of a length of the preamble waveform.

11. The apparatus of claim 7, wherein the preamble waveform comprises a Wi-Fi preamble or a new radio unlicensed (NR-U) preamble.

12. The apparatus of claim 11, wherein the Wi-Fi preamble comprises an indication of a device type of the UE.

13. An apparatus for wireless communication, comprising:
a processor;
memory in electronic communication with the processor; and
instructions stored in the memory, wherein the instructions are executable by the processor to:

receive, from a network entity, a preamble configuration for an uplink transmission associated with a second radio access technology;

generate, based at least in part on the preamble configuration, a preamble waveform associated with a first radio access technology; and perform the uplink transmission to the network entity, wherein the preamble waveform is appended to a beginning of the uplink transmission based at least in part on the preamble configuration.

14. The apparatus of claim 13, wherein the instructions are further executable by the processor to:

determine, based at least in part on the preamble configuration, whether the apparatus is permitted to append the preamble waveform to the uplink transmission, wherein the instructions executable by the processor to perform the uplink transmission to the network entity is based at least in part on the determination.

15. The apparatus of claim 13, wherein the instructions are further executable by the processor to:

determine, based at least in part on the preamble configuration, a format of the preamble waveform, wherein the instructions executable by the processor to generate the preamble waveform is based at least in part on the determined format.

16. The apparatus of claim 15, wherein the instructions executable by the processor to determine the format of the preamble waveform is further based at least in part on a band of the uplink transmission.

17. The apparatus of claim 13, wherein the instructions are further executable by the processor to:

determine, based at least in part on the preamble configuration, a time at which the apparatus is permitted to transmit the preamble waveform, wherein the instructions executable by the processor to generate the preamble waveform is based at least in part on the determined time.

18. The apparatus of claim 17, wherein the preamble configuration is received in a downlink control information block comprising an indication of the time at which the apparatus is permitted to transmit the preamble waveform.

19. The apparatus of claim 17, wherein the instructions executable by the processor to determine the time at which the apparatus is permitted to transmit the preamble waveform is further based at least in part on one or more of: an uplink channel configuration of the apparatus or a bandwidth of the uplink transmission.

20. The apparatus of claim 17, wherein the instructions are further executable by the processor to:

receive an indication of a transmission opportunity of the network entity, wherein the instructions executable by the processor to determine the time at which the apparatus is permitted to transmit the preamble waveform is further based at least in part on the transmission opportunity of the network entity.

21. The apparatus of claim 13, wherein the instructions are further executable by the processor to:

receive an indication of a duration field value from the network entity, wherein the instructions executable by the processor to generate the preamble waveform comprises instructions executable by the processor to signal the indicated duration field value in the preamble waveform.

22. An apparatus for wireless communications at a network entity, comprising:

a processor;

memory in electronic communication with the processor; and instructions stored in the memory, wherein the instructions are executable by the processor to:

transmit, to a user equipment (UE), a preamble configuration comprising an indication to append a preamble waveform to an uplink transmission, wherein the preamble waveform is associated with a first radio access technology and the uplink transmission is associated with a second radio access technology; and receive the uplink transmission from the UE, wherein the preamble waveform is appended to a beginning of the uplink transmission based at least in part on the preamble configuration.

23. The apparatus of claim 22, wherein the instructions are further executable by the processor to:

include in the preamble configuration an indication that the UE is permitted to append the preamble waveform to the uplink transmission.

24. The apparatus of claim 22, wherein the instructions are further executable by the processor to:

include in the preamble configuration an indication of a format of the preamble waveform.

25. The apparatus of claim 24, wherein the format of the preamble waveform is further based at least in part on a band of the uplink transmission.

26. The apparatus of claim 22, wherein the instructions are further executable by the processor to:

include in the preamble configuration an indication of a time at which the UE is permitted to transmit the preamble waveform.

27. The apparatus of claim 26, wherein the preamble configuration is transmitted in a downlink control information block comprising the indication of the time at which the UE is permitted to transmit the preamble waveform.

28. The apparatus of claim 26, wherein the time at which the UE is permitted to transmit the preamble waveform is further based at least in part on one or more of: an uplink channel configuration of the UE or a bandwidth of the uplink transmission.

29. The apparatus of claim 26, wherein the instructions are further executable by the processor to:

transmit an indication of a transmission opportunity of the apparatus to the UE, wherein the time at which the UE is permitted to transmit the preamble waveform is further based at least in part on the transmission opportunity of the apparatus.

30. The apparatus of claim 22, wherein the instructions are further executable by the processor to:

transmit an indication of a duration field value to the UE.

* * * * *